US012172273B2

(12) United States Patent
Uchiyama

(10) Patent No.: US 12,172,273 B2
(45) Date of Patent: Dec. 24, 2024

(54) STRIKING TOOL

(71) Applicant: MAX CO., LTD., Tokyo (JP)

(72) Inventor: Toru Uchiyama, Tokyo (JP)

(73) Assignee: Max Co., Ltd., Tokyo (JP)

( * ) Notice: Subject to any disclaimer, the term of this patent is extended or adjusted under 35 U.S.C. 154(b) by 93 days.

(21) Appl. No.: 16/911,047

(22) Filed: Jun. 24, 2020

(65) Prior Publication Data

US 2020/0406438 A1 Dec. 31, 2020

(30) Foreign Application Priority Data

Jun. 25, 2019 (JP) ................................ 2019-117686
Jun. 5, 2020 (JP) ................................ 2020-098262

(51) Int. Cl.
*B25C 1/04* (2006.01)
*B25C 1/00* (2006.01)
*B25C 7/00* (2006.01)

(52) U.S. Cl.
CPC .................. *B25C 1/04* (2013.01); *B25C 7/00* (2013.01); *B25C 1/008* (2013.01)

(58) Field of Classification Search
CPC ........... B25C 7/00; B25C 1/008; B25C 1/043; B25C 1/04; B25C 1/06; B25C 1/047
See application file for complete search history.

(56) References Cited

U.S. PATENT DOCUMENTS 5,649,661 A 7/1997 Masuno et al.
5,810,239 A * 9/1998 Stich ......................... B25C 7/00 227/123
6,071,035 A * 6/2000 McKelvy .................. F16D 1/02 403/322.2
6,286,742 B1 * 9/2001 Mukoyama ............... B25C 7/00 227/8
2005/0189394 A1 9/2005 Terrell
2006/0081677 A1 4/2006 Yasuike et al.
2009/0039135 A1 2/2009 Kubo
2018/0099400 A1 4/2018 Wong et al.
2018/0153560 A1 * 6/2018 Chenaux ............ A61B 17/1666

FOREIGN PATENT DOCUMENTS

EP 0729809 A1 9/1996
EP 1995023 A1 3/2007
JP S51-042577 U 3/1976
JP H05-002879 U 1/1993
JP H08-257936 A 10/1996
JP 2000-061865 A 2/2000
JP 2004-257226 A 9/2004

(Continued)

OTHER PUBLICATIONS

The Extended European Search Report mailed in corresponding EP Patent Application No. 20181668.3 on Sep. 24, 2020 (8 pages).

*Primary Examiner* — Veronica Martin
(74) *Attorney, Agent, or Firm* — Banner & Witcoff, Ltd.

(57) ABSTRACT

A striking tool having an ejecting path of a fastener which is formed in a nose part, and configured to sequentially strike fasteners supplied to the nose part, includes an attachment member that can be attached to and detached from a tip end of the nose part. The attachment member can be fixed to and released from the nose part by an operation in a direction different from an ejecting direction of the fastener.

22 Claims, 26 Drawing Sheets

(56) References Cited

FOREIGN PATENT DOCUMENTS

| | | | |
|---|---|---|---|
| JP | 2006-147272 | A | 6/2006 |
| JP | 2007-066545 | A | 3/2007 |
| JP | 2007-245262 | A | 9/2007 |
| JP | 2014-231136 | A | 12/2014 |
| JP | 2016-078200 | A | 5/2016 |

* cited by examiner

STRIKING TOOL

CROSS-REFERENCE TO RELATED APPLICATIONS

This application is based upon and claims the benefit of priority from prior Japanese patent application No. 2019-117686, filed on Jun. 25, 2019 and Japanese patent application No. 2020-98262, filed on Jun. 5, 2020, the entire contents of which are incorporated herein by reference.

TECHNICAL FIELD

The present invention relates to a striking tool configured to sequentially strike fasteners supplied to a nose part, and particularly, to a striking tool in which an attachment can be attached to and detached from a tip end of a nose part.

BACKGROUND ART

This type of striking tool is configured to impact and strike a fastener supplied to a nose part provided at a tip end of a tool main body by a driver. In the striking tool, it is dangerous if the fastener is always struck out when a trigger for driving the driver is pulled. Therefore, a related-art striking tool is provided with a safety device in which a contact arm is slidably arranged along the nose part, and the contact arm is slid to enable an operation of the trigger when the nose part is pressed against a member to be struck. The safety device is provided, so that even when the trigger is operated in a state where the nose part is not pressed against the member to be struck, the fastener is not struck, which improves safety.

Regarding the striking tool, PTL 1 discloses a configuration where an arm tip end component fixed to a tip end of a contact arm and configured to slide along a nose part and a tubular attachment member detachably mounted to the arm tip end component are provided. In the technique disclosed in PTL 1, it is possible to use an attachment member, which matches a diameter of a nail, by replacing an attachment member. In the meantime, the attachment member disclosed in PTL 1 can be fitted and fixed to the arm tip end component by press-fitting the same in an ejecting direction of the fastener.

PTL 1: JP-A-2014-231136

When the attachment member as described above is used, it is also possible to drive a nail with floating a head (so-called "float striking"). That is, when the attachment member largely protruding in a direction of the tip end is used so that the driver does not reach the tip end of the attachment member upon striking of the nail, the nail is struck shallowly, so that a head of the nail is floated. For example, when the nail is float-struck while assembling a wooden framework into which concrete is poured, the nail can be easily pulled out when dismantling the framework after using the same.

However, as described above, in the structure where the attachment member is press-fitted and attached in the ejecting direction of the fastener, the attachment member is likely to come off during the striking operation. For example, when float-striking the nail, if a machine is tilted due to recoil upon the striking, the floated head of the nail is hooked on the attachment member, so that the attachment member may come off.

In the meantime, in order to prevent the attachment member from coming off, the attachment member is preferably tightly fitted. However, if the attachment member is tightly fitted, the attachment member is difficult to come off but a large operation load is required when attaching and detaching the attachment member, which makes it difficult to attach and detach the attachment member.

It is therefore an object of the present invention to provide a striking tool in which an attachment member can be easily attached and detached and can be effectively prevented from coming off.

SUMMARY OF INVENTION

According to an aspect of the invention, there is provided a striking tool having an ejecting path of a fastener which is formed in a nose part, and configured to sequentially strike fasteners supplied to the nose part, the striking tool comprising: an attachment member that can be attached to and detached from a tip end of the nose part, wherein the attachment member can be fixed to and released from the nose part by an operation in a direction different from an ejecting direction of the fastener.

BRIEF DESCRIPTION OF DRAWINGS

FIG. 4A is a plan view of, FIG. 4B is a front view, FIG. 4C is a side view, and FIG. 4D is a bottom view.

FIG. 5A is a perspective view, FIG. 5B is a sectional perspective view parallel to an ejecting path, and FIG. 5C is a sectional perspective view perpendicular to the ejecting path.

FIG. 6A is a side sectional view parallel to the ejecting path, and FIG. 6B is a sectional view taken along a line A-A.

FIG. 7A is a perspective view, FIG. 7B is a sectional perspective view parallel to the ejecting path, and FIG. 7C is a sectional perspective view perpendicular to the ejecting path.

FIG. 8A is a side sectional view parallel to the ejecting path, and FIG. 8B is a sectional view taken along a line B-B.

FIG. 9A is a perspective view, FIG. 9B is a sectional perspective view parallel to the ejecting path, and FIG. 9C is a sectional perspective view perpendicular to the ejecting path.

FIG. 10A is a side sectional view parallel to the ejecting path, and FIG. 10B is a sectional view taken along a line C-C.

FIG. 14A depicts an outer shape thereof, and FIG. 14B is an enlarged view of a D part.

FIG. 15A is a sectional perspective view parallel to a mounting direction and FIG. 15B is a sectional perspective view perpendicular to the mounting direction.

FIG. 16A depicts an outer shape and FIG. 16B is an enlarged view of an E part.

FIG. 17A is a sectional perspective view parallel to the mounting direction and FIG. 17B is a sectional perspective view perpendicular to the mounting direction.

FIG. 19A is a perspective view and FIG. 19B is a sectional perspective view perpendicular to the ejecting path.

FIG. 20A is a side sectional view parallel to the ejecting path and FIG. 20B is a sectional view taken along a line F-F.

FIG. 20A is a perspective view and FIG. 20B is a sectional perspective view perpendicular to the ejecting path.

FIG. 23A is a side sectional view parallel to the ejecting path and FIG. 23B is a sectional view taken along a line G-G.

FIG. 25A is a plan view, FIG. 25B is a side view, FIG. 25C is a plan view, FIG. 25D is a sectional view taken along a line H-H, and FIG. 25E is a bottom view.

DESCRIPTION OF EMBODIMENTS

Embodiments of the present invention will be described with reference to the drawings.

Figure 1:
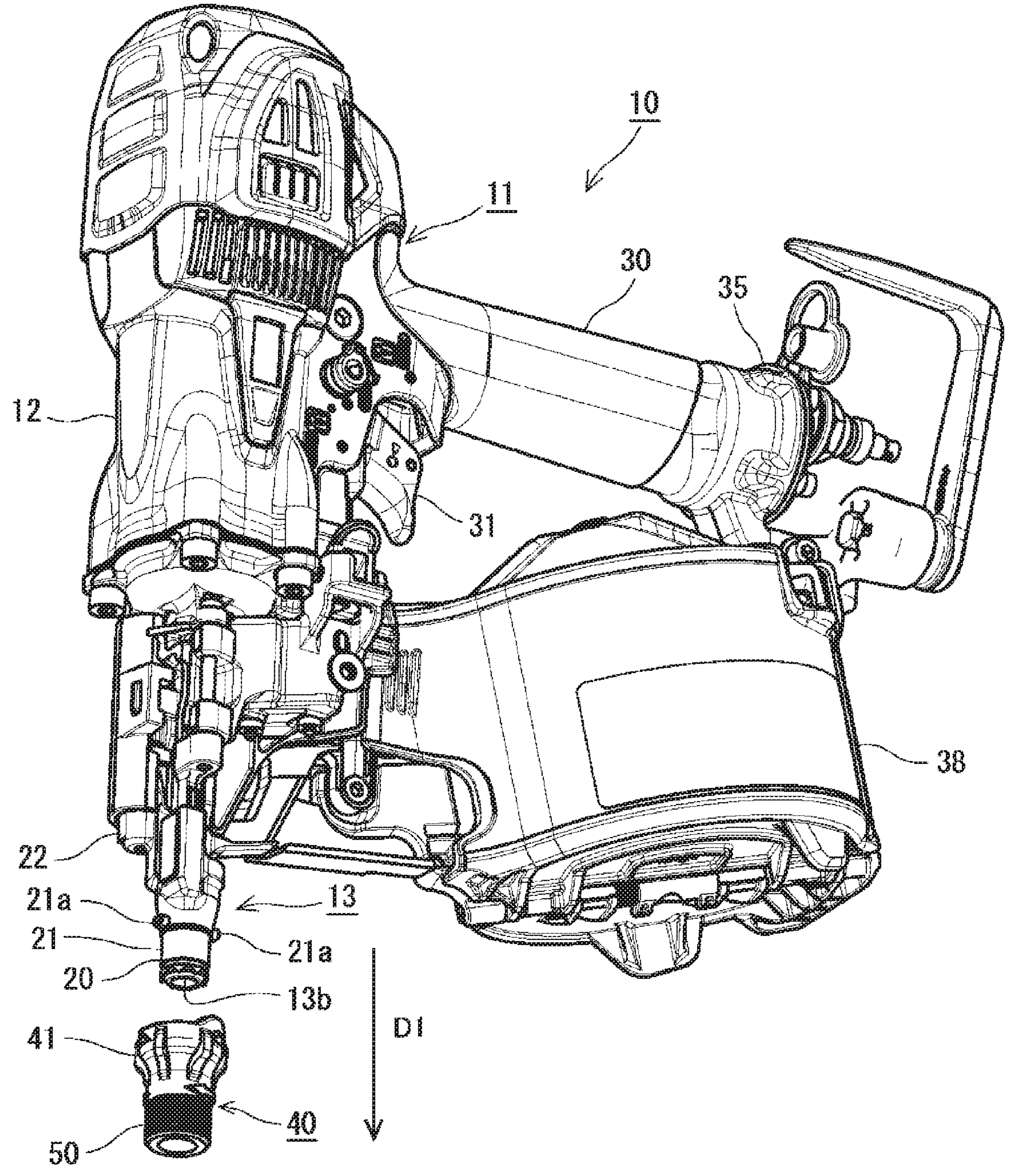
FIG. 1 depicts an outer shape of a striking tool.

A striking tool 10 of the present embodiment is configured to sequentially strike out fasteners supplied to a nose part 13 by using a compressed air. As shown in FIG. 1, the striking tool 10 includes a tool main body 11 having a nose part 13, a magazine 38 connected to the tool main body 11 on a side of the nose part 13, and an attachment member 40 that can be attached to and detached from a tip end of the nose part 13. In the meantime, in the present embodiment, the pneumatic striking tool 10 is described as an example. However, the target of the present invention is not limited to the pneumatic striking tool 10. The attachment member 40 of the present invention can also be used for the striking tool 10 having another power source such as a gas combustion type or an electricity type.

The tool main body 11 has such a configuration that a body housing 12 and a grip housing 30 are connected at a substantial right angle. Although not specifically shown, a striking cylinder is arranged inside the body housing 12, and a striking piston is slidably accommodated inside the striking cylinder. On a bottom of the striking piston, a driver for striking a fastener is coupled, so that when the striking piston is actuated, the fastener can be struck out by the driver.

Also, the grip housing 30 is a rod-shaped part that is gripped by an operator when using the striking tool 10. The grip housing 30 is operably provided with a trigger 31. Specifically, the trigger 31 is arranged in a position in which an index finger is located when the operator grips the grip housing 30, so that the trigger 31 can be pulled with the index finger.

Figure 5A:
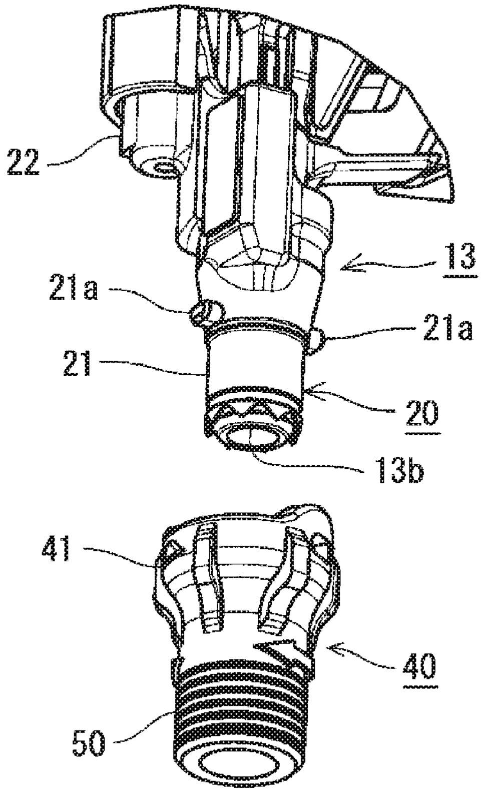
FIGS. 5A, 5B and 5C depict a nose part before the attachment member is mounted.
Figure 5B:
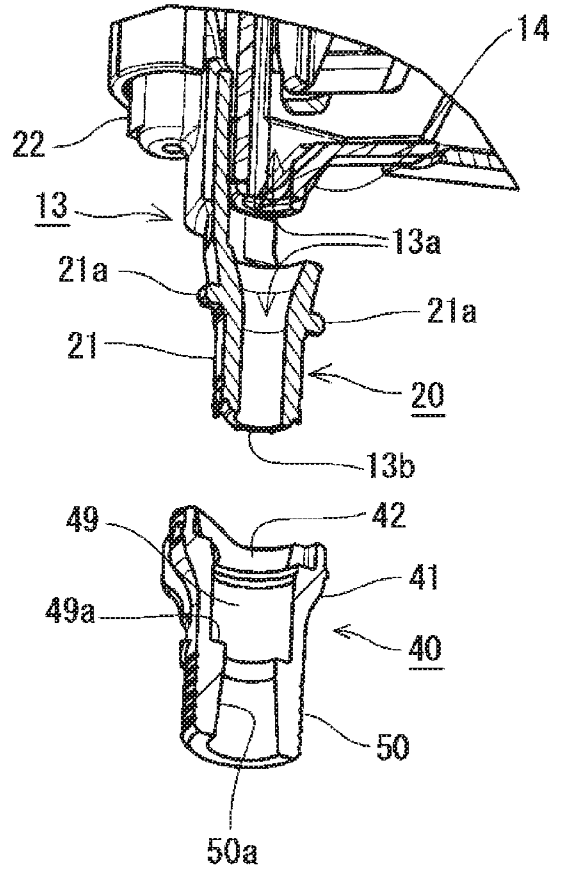

When seen in an ejecting direction D1 of the fastener, a tip end of the body housing 12 is provided with a nose part 13 that forms an ejecting path 13*a* of the fastener (refer to FIG. 5B and the like). The driver is slidably guided in a direction of the nose part 13. In the meantime, although not specifically shown, a fastener supply mechanism is provided behind the nose part 13. The fastener supply mechanism is actuated in association with a striking operation, so that fasteners loaded in the magazine 38 are sequentially supplied to the nose part 13.

Figure 11:
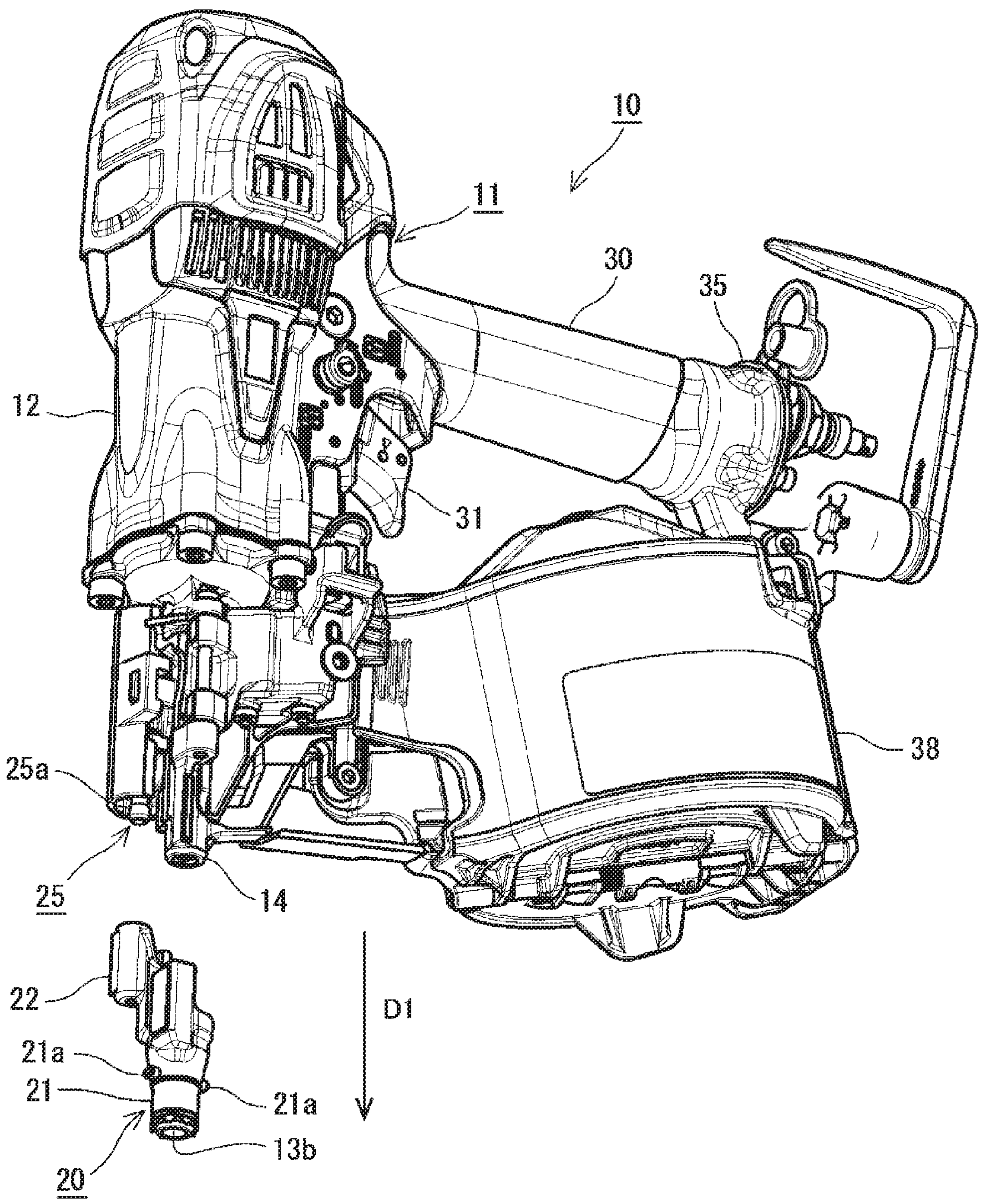
FIG. 11 depicts an outer shape of the striking tool from which a contact nose is detached.
Figure 12:
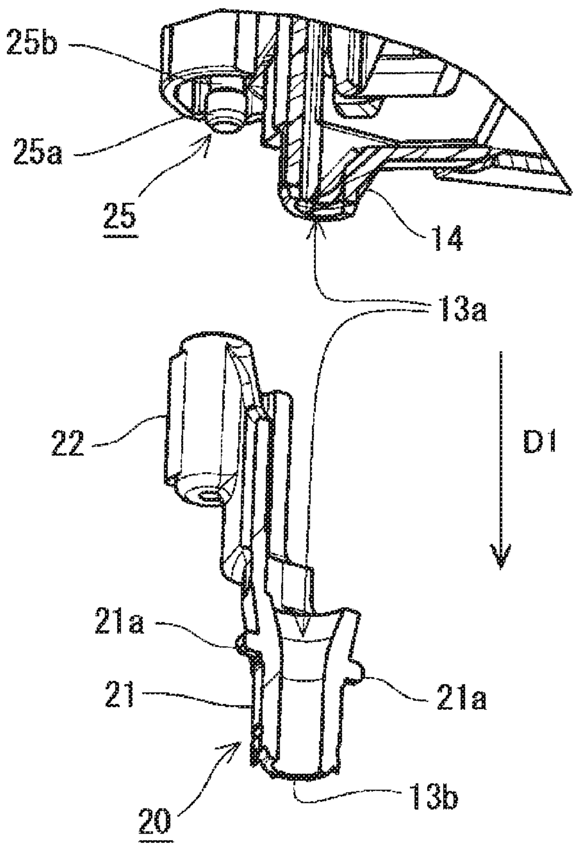
FIG. 12 is an enlarged sectional perspective view of a vicinity of the nose part in a state where the contact nose is detached.
Figure 13:
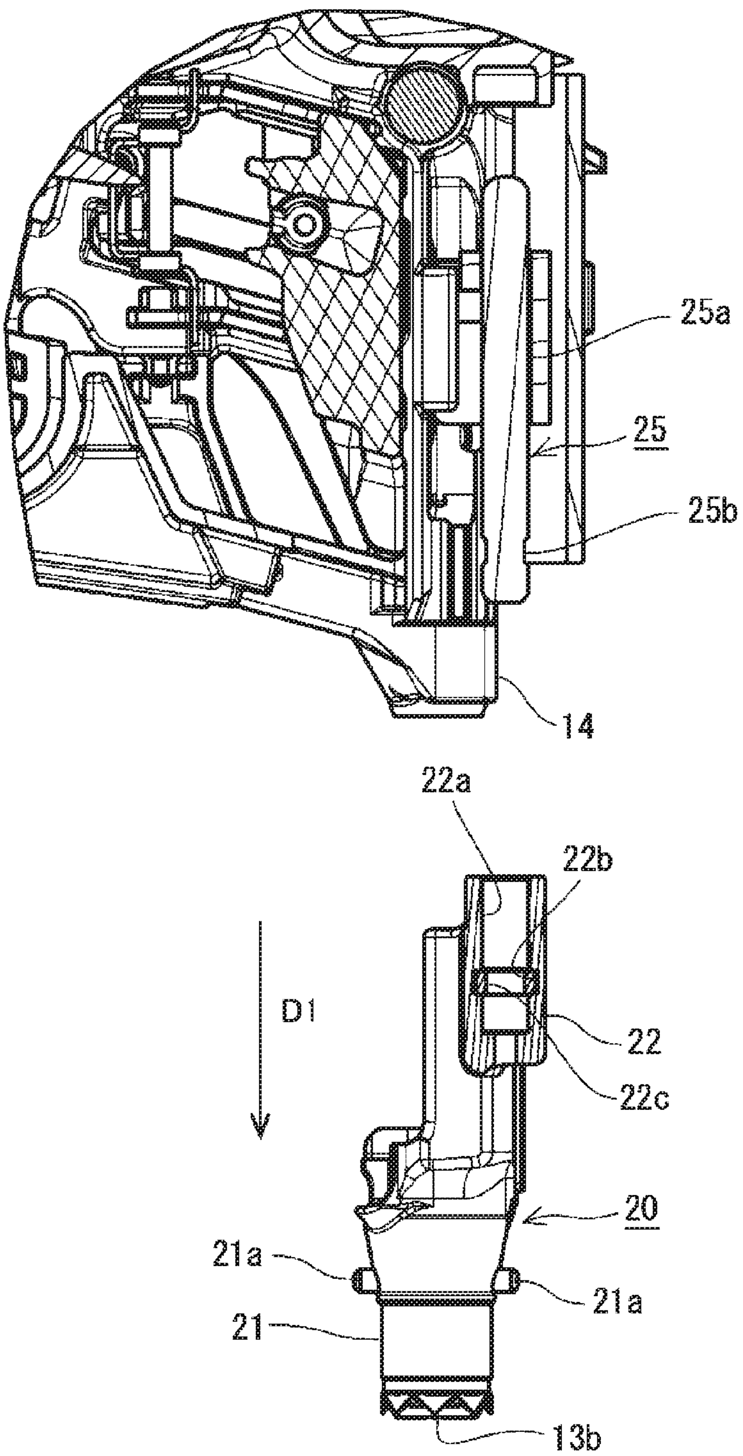
FIG. 13 is an enlarged side sectional view of the vicinity of the nose part in the state where the contact nose is detached.

As shown in FIGS. 11 to 13, the nose part 13 of the present embodiment has a nose main body 14, a contact nose 20, and a contact arm 25.

The nose main body 14 is a part to which the fastener supply mechanism is connected, and has a tubular shape so that the fasteners supplied by the fastener supply mechanism can be accommodated. The nose main body 1 is fixed as a part of the body housing 12, and is formed integrally with the body housing 12 or is immovably fixed to the body housing 12.

The contact nose 20 that can be vertically slid with respect to the nose main body 14 is arranged on a tip end of the nose main body 14. The contact nose 20 is configured to be detachably mounted to the contact arm 25 that will be described later. When the contact nose 20 is mounted to the contact arm 25, as shown in FIG. 5B, the nose main body 14 and the ejecting path 13*a* of the fastener formed inside the contact nose 20 communicate with each other. Also, when the contact nose 20 is mounted to the contact arm 25, the contact nose 20 can be freely slid integrally with the contact arm 25 along the ejecting direction D1 of the fastener.

As shown in FIGS. 11 to 13, the contact nose 20 has an ejecting part 21 and an attachment part 22.

Figure 5C:
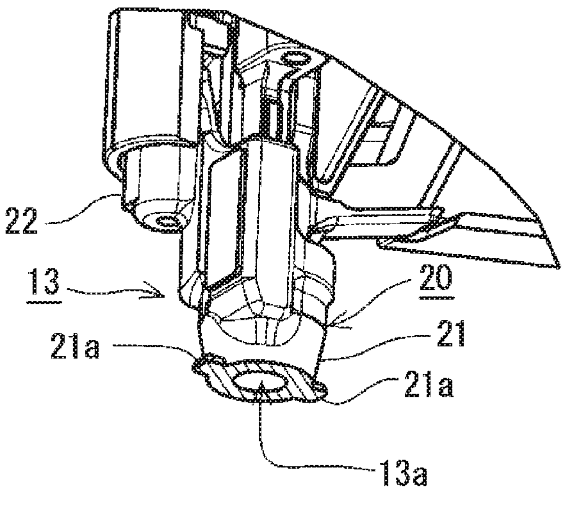

The ejecting part 21 is a part for forming the ejecting path 13*a* of the fastener, and is also a tubular part arranged continuously to the ejecting path 13*a* of the nose main body 14. As shown in FIGS. 5A to 5C, two engaging protrusions 21*a* protruding radially are formed on an outer periphery of the ejecting part 21. The two engaging protrusions 21*a* protrude in opposite directions. Specifically, the engaging protrusions 21*a* are formed in front of and behind the ejecting part 21 so as to overlap a plane (a plane including an axis of the ejecting part 21 and an axis of the grip housing 30) that divides the striking tool 10 right and left. The engaging protrusions 21*a* are provided so as to engage and fix the attachment member 40 that will be described later.

The attachment part 22 is a part for attachment to the contact arm 25, and is formed to have a tubular shape in which an attachment shaft 25*a* of the contact arm 25, which will be described later, can be inserted. As shown in FIG. 13, the attachment part 22 has an attachment hole 22*a* in which the attachment shaft 25*a* can be inserted, and an axis of the attachment hole 22*a* is formed in parallel to the axis of the ejecting part 21. Also, an attachment groove 22*b* having a circumferential groove shape is formed on the way of the attachment hole 22*a*, and a ring-shaped elastic member 22*c* (for example, an O-ring made of rubber) is attached to the attachment groove 22*b*.

The contact arm 25 configures a safety device of the striking tool 10, and is provided to be slid to enable an operation of the trigger 31 when the nose part 13 (the contact nose 20 or the attachment member 40) is pressed against a member to be struck. The contact arm 25 is provided to be slidable along the ejecting direction D1 of the fastener, and is urged in a direction of the tip end of the nose part 13 in a natural state. When the contact nose 20 is pressed against the member to be struck, against the urging force, the contact arm 25 is moved upward integrally with the contact nose 20. The contact arm 25 is moved upward, so that a well-known safety mechanism enables an operation of the trigger 31. In other words, in a state where the contact nose 20 is not pressed against the member to be struck and the contact arm 25 is not moved upward, the safety mechanism disables an operation of the trigger 31 and the fastener is not struck.

In the striking tool 10 of the present embodiment, when the trigger 31 is operated in a state where the contact nose 20 is pressed against the member to be struck (or when the contact nose 20 is pressed against the member to be struck in a state where the trigger 31 is operated), the compressed air supplied from an air supply source such as an air compressor connected to an end cap part 35 of a rear end of the grip housing 30 is supplied into the striking cylinder and the compressed air acts on the striking piston, so that the striking piston is driven and the driver coupled to the striking piston strikes a leading fastener. The fastener struck by the driver passes through the ejecting path 13*a* inside the nose part 13 and is then struck out from an ejecting port 13*b* opened to a tip end of the contact nose 20.

In the meantime, as shown in FIG. 13, the contact arm 25 has an attachment shaft 25*a* for attaching the contact nose 20. The attachment shaft 25*a* is a rod-shaped member that can be inserted in the attachment hole 22*a* of the contact nose 20. In the vicinity of a tip end of the attachment shaft 25*a*, an engaging groove 25*b* having a circumferential groove shape is concavely provided. The elastic member 22*c* of the contact nose 20 is engaged in the engaging groove 25*b*, so that the contact arm 25 and the contact nose 20 are fitted and fixed to each other.

That is, when attaching the contact nose 20 to the contact arm 25, the attachment shaft 25*a* is inserted into the attachment hole 22*a*, and the contact nose 20 is press-fitted to the contact arm 25 in parallel to the ejecting direction D1 of the fastener. By the operation, the elastic member 22*c* is fitted to the engaging groove 25*b*, and the contact nose 20 is firmly fixed to the contact arm 25.

In the meantime, when detaching the contact nose 20 from the contact arm 25, an operation of strongly pulling out the contact nose 20 from the contact arm 25 is performed. By the operation, the elastic member 22*c* fitted to the engaging groove 25*b* is removed and the fixed state of the contact nose 20 and the contact arm 25 is released.

The magazine 38 is to accommodate therein a coupled fastener having a plurality of coupled fasteners. The coupled fastener accommodated in the magazine 38 is pulled out in a row, is supplied to the nose part 13, and is maintained so that the leading fastener is located just below the driver.

Figure 2:
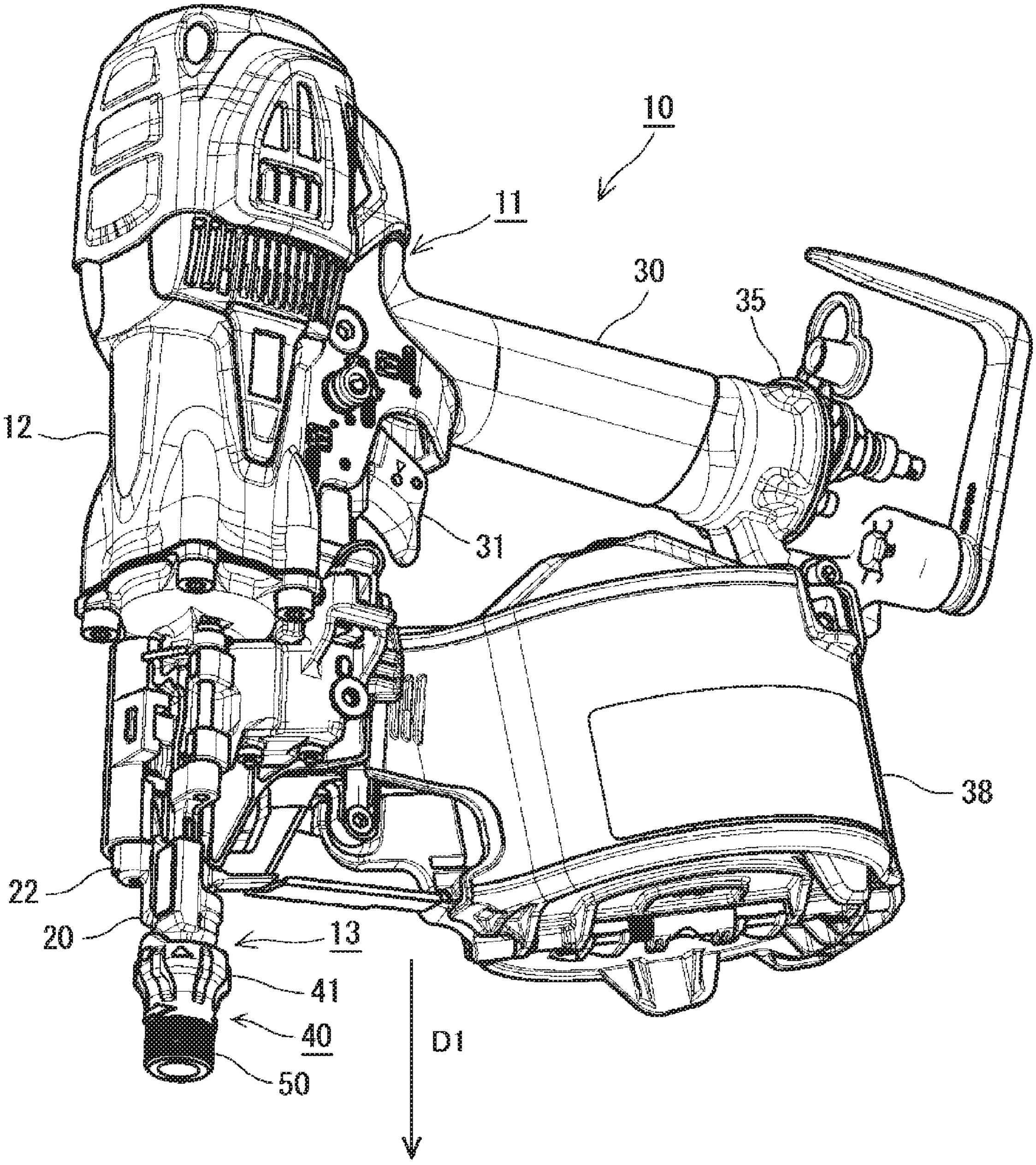
FIG. 2 depicts an outer shape of the striking tool to which an attachment member is mounted.

The attachment member 40 is a member that can be mounted to the tip end of the contact nose 20, and is used with being mounted to the tip end of the contact nose 20 when it is intended to float-strike the fastener or when it is intended to prevent the member to be struck from being scratched due to the contact nose 20, for example, as shown in FIG. 2. The attachment member 40 of the present embodiment is formed of an elastic material such as rubber, other resin or the like.

The attachment member 40 is configured so that it can be fixed to and released from the nose part 13 (contact nose 20) by an operation in a direction different from the ejecting direction D1 of the fastener. Specifically, the attachment member 40 is configured so that it can be fixed to and released from the nose part 13 by a rotating operation in a circumferential direction D2 of the ejecting path 13*a*.

Figure 3:
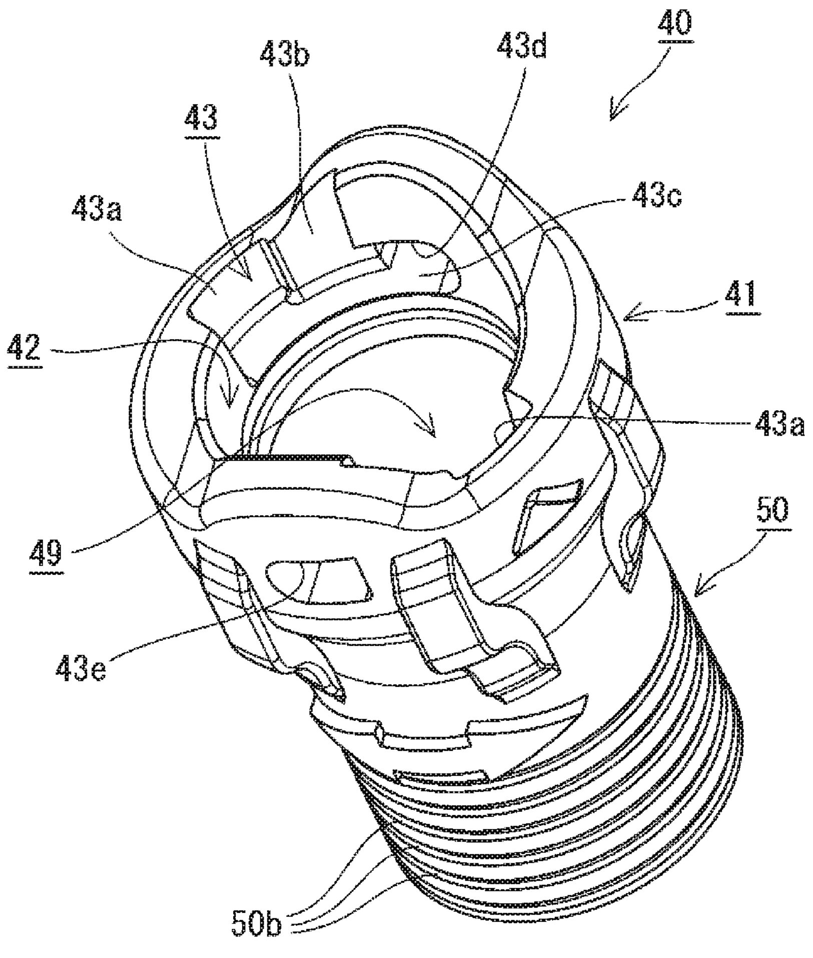
FIG. 3 depicts an outer shape of the attachment member.
Figure 4A:
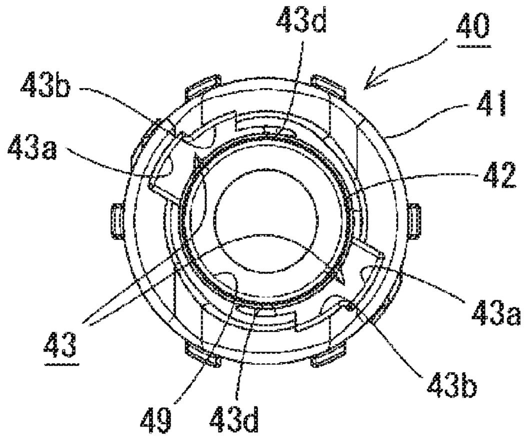
FIGS. 4A, 4B, 4C and 4D depict the attachment member.
Figure 4B:
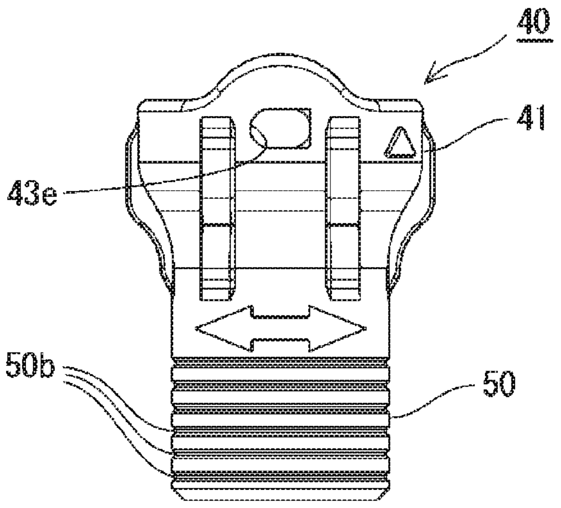
Figure 4C:
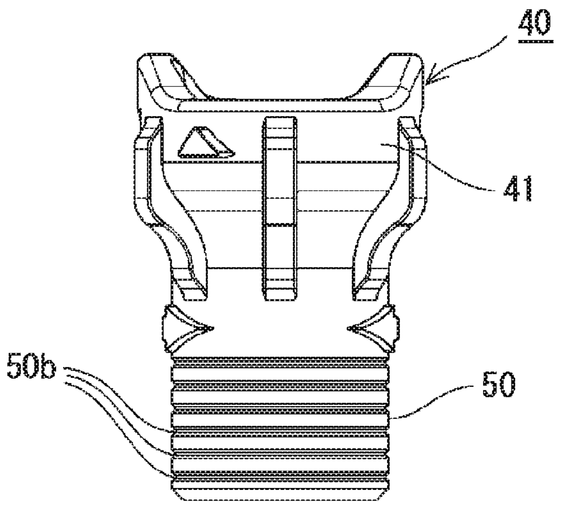
Figure 4D:
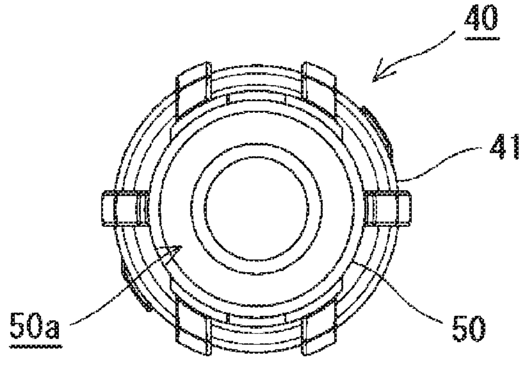

The attachment member 40 has a tubular shape as shown in FIGS. 3 to 4D, in which an attachment part 41 for attachment to the contact nose 20 and an ejection guide part 50 provided on a further tip end than the attachment part 41 are provided continuously in an axial direction.

As shown in FIGS. 5A to 6B, the attachment part 41 has an engaging portion 42 for engagement to the engaging protrusions 21*a* of the contact nose 20 and an insertion portion 49 into which the tip end of the contact nose 20 is inserted.

As shown in FIG. 3, the engaging portion 42 has guide grooves 43 formed to guide the engaging protrusions 21*a* of the contact nose 20 and to engage the engaging protrusions 21*a*. The engaging protrusions 21*a* are engaged to the guide grooves 43, so that the attachment member 40 can be attached to the contact nose 20. In the present embodiment, the guide groove 43 is formed into a substantial L-shape on an inner periphery of the attachment member 40, and specifically, has such a shape where a groove formed in an axial direction of the attachment member 40 and a groove formed in a circumferential direction of the attachment member 40 continue. In the present embodiment, the plurality of guide grooves 43 is arranged with equal intervals in the circumferential direction of the attachment member 40. Specifically, the attachment member 40 of the present embodiment has the two guide grooves 43, and the two guide grooves 43 are arranged with equal intervals in the circumferential direction of the attachment member 40. That is, the two guide grooves 43 are arranged to face each other on an inner side of the attachment member 40.

The guide groove 43 has an introduction opening 43*a*, an operation resisting portion 43*b*, and an engaging holding portion 43*c*. The introduction opening 43*a*, the operation resisting portion 43*b* and the engaging holding portion 43*c* are arranged adjacent to each other so as to continue in the circumferential direction of the attachment member 40.

The introduction opening 43*a* is a groove formed in the axial direction of the attachment member 40 so as to guide the engaging protrusion 21*a* into the guide groove 43. As shown in FIG. 4A, the introduction opening 43*a* is formed up to an opening edge of the attachment member 40 and is opened radially more largely than the operation resisting portion 43*b* and the engaging holding portion 43*c*. By this configuration, when the engaging protrusions 21*a* are in positional alignment with the introduction openings 43*a*, the engaging protrusions 21*a* can be inserted into the guide grooves 43, i.e., the tip end of the contact nose 20 can be inserted into the attachment member 40.

In the meantime, since the portions other than the introduction opening 43*a* are opened radially less than a protruding amount of the engaging protrusion 21*a*, the engaging protrusion 21*a* cannot pass therethrough. Therefore, in a state where the engaging protrusions 21*a* are not in positional alignment with the introduction openings 43*a*, the engaging protrusions 21*a* cannot be inserted into the guide grooves 43.

The operation resisting portion 43*b* is a portion that, when an operation of fixing or releasing the attachment member 40 to or from the nose part 13 is performed, resists the operation. Since the operation resisting portion 43*b* is arranged between the introduction opening 43*a* and the engaging holding portion 43*c*, when the engaging protrusion 21*a* moves between the introduction opening 43*a* and the engaging holding portion 43*c*, the engaging protrusion passes the operation resisting portion 43*b* all the time. A distance between the operation resisting portions 43*b* arranged to face each other (a diameter of a hollow part of the attachment member 40 between the two operation resisting portions 43*b*) is set smaller than a distance connecting tip ends of the two engaging protrusions 21*a* arranged to face each other (a diameter of the contact nose 20 passing through the two engaging protrusions 21*a*). By this configuration, when the attachment member 40 is rotated in the circumferential direction D2 of the ejecting path 13*a* in the state where the engaging protrusions 21*a* are inserted in the guide grooves 43, the engaging protrusions 21*a* are hooked on the operation resisting portions 43*b*. When an operating load of the rotating operation becomes equal to or higher than a predetermined load, the attachment member 40 is elastically deformed, so that the engaging protrusions 21*a* can ride over the operation resisting portions 43*b*. In this way, the engaging protrusions 21*a* ride over the operation resisting portions 43*b*, so that the engaging protrusions 21*a* can move from the introduction openings 43*a* to the engaging holding portions 43*c* or the engaging protrusions 21*a* can move from the engaging holding portions 43*c* to the introduction openings 43*a*.

The engaging holding portion 43*c* is a groove for holding the engaging protrusion 21*a* when the attachment member 40 is fixed to the nose part 13. In other words, a state where the attachment member 40 is fixed to the nose part 13 means a state where the engaging protrusions 21*a* are engaged to the engaging holding portions 43*c*. On the contrary, when the engaging protrusions 21*a* are separated from the engaging holding portions 43*c*, the attachment member 40 can be released from the nose part 13.

As shown in FIG. 3 and the like, a protrusion portion 43*d* formed to overhang the guide groove 43 is provided on a further upstream side (an opening edge side of the attachment member 40) than the engaging holding portion 43*c* with respect to the ejecting direction D1 of the fastener. Due to the protrusion portion 43*d*, the engaging protrusion 21*a* engaged to the engaging holding portion 43*c* cannot move toward the opening edge side of the attachment member 40. That is, even when a force of pulling out the attachment member 40 in the ejecting direction D1 of the fastener is applied, the attachment member 40 is not detached from the nose part 13.

Also, the engaging holding portion 43*c* is formed as a portion of a hole penetrating in a radial direction, and the hole is opened to a surface of the attachment member 40, so that a check window 43*e* as shown in FIGS. 3 and 4B is formed. Through the check window 43*e*, a state of the engaging holding portion 43*c* can be visually recognized from an outside. Therefore, for example, it is possible to check whether the engaging protrusion 21*a* is securely engaged to the engaging holding portion 43*c*.

The insertion portion 49 is to insert the cylindrical tip end of the contact nose 20, and is a tubular portion provided on a further tip end side than the engaging portion 42 in the ejecting direction D1 of the fastener. The insertion portion 49 has an inner diameter that is the same as an outer diameter of the contact nose 20 so as to hold the contact nose 20. As shown in FIG. 5B, a step portion 49*a* capable of abutting the tip end of the contact nose 20 is formed on an inner side of the insertion portion 49. The insertion portion 49 is provided, so that it is possible to easily perform the positioning when attaching the attachment member 40. That is, it is possible to easily arrange the attachment member 40 and the contact nose 20 on the same axis simply by inserting the contact nose 20 into the insertion portion 49.

Figure 10A:
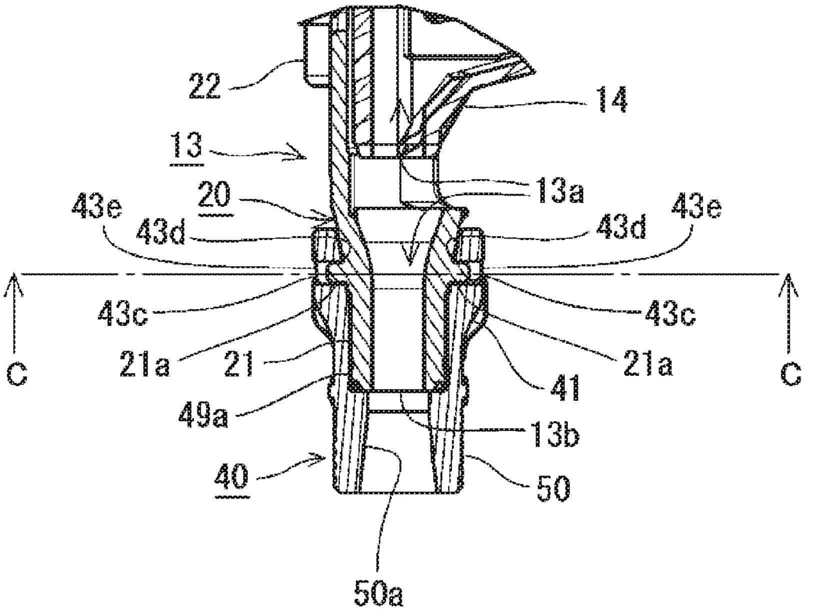
FIGS. 10A and 10B depict the nose part after the attachment member is mounted.
Figure 10B:
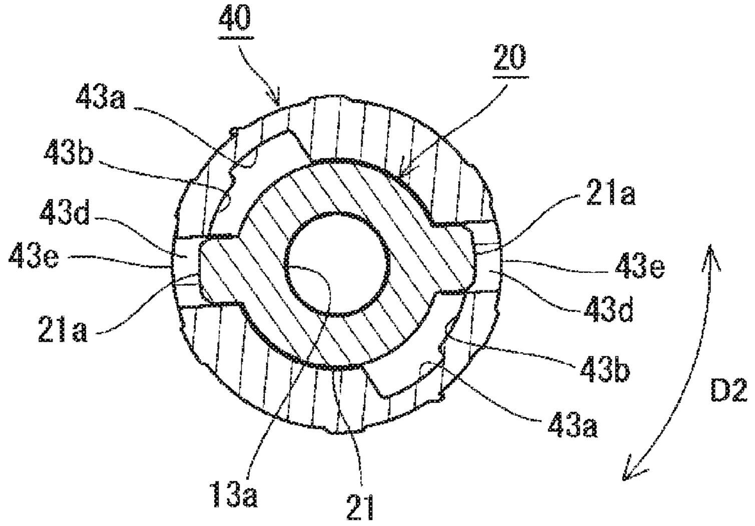

The ejection guide part 50 is a part that further protrudes in the direction of the tip end than the nose part 13 when the attachment member 40 is attached to the nose part 13, and that guides ejection of the fastener on a further tip end side than the nose part 13. As shown in FIG. 10A and the like, the ejection guide part 50 has a guide path 50*a* continuing to the ejecting path 13*a* of the nose part 13, and is configured so that the fastener having passed through the guide path 50*a* is ejected from the tip end of the attachment member 40.

An inner diameter of the guide path 50*a* of the present embodiment is formed to have a tapered shape so as to progressively increase toward the tip end. By this configuration, when float-striking the fastener by the attachment member 40, even though a machine is tilted due to recoil upon the striking, a head portion of the floated fastener is difficult to be hooked on the attachment member 40.

In the meantime, in a general type of a fastener, it is not preferable to largely open the guide path 50*a* because it is not possible to suppress the fastener from being tilted. However, since the attachment member 40 of the present embodiment is adapted to float-strike the fastener so as to easily pull out the fastener, the tilting of the fastener is permitted to some extent. Since there is a problem that the head portion of the fastener is likely to be hooked due to the float striking, the guide path 50*a* is opened in a tapered shape.

Also, a plurality of cut grooves 50*b* as shown in FIG. 3 and the like is formed on an outer peripheral surface of the ejection guide part 50. The cut grooves 50*b* can be used as a guide when a user cuts the ejection guide part 50 into any length. The cut grooves 50*b* are circumferential grooves formed perpendicularly to the ejecting direction D1 of the fastener and are provided with constant intervals. The ejection guide part 50 is cut into any length by using the cut grooves 50*b*, so that the user can arbitrarily adjust a protruding amount (a height of the float striking) of the attachment member 40.

The attachment member 40 can be mounted to the nose part 13 according to a following sequence.

First, as shown in FIGS. 5A to 6B, the attachment part 41 of the attachment member 40 is directed toward the tip end of the nose part 13. At this time, the engaging protrusions 21*a* are positionally aligned with the introduction openings 43*a*. In this state, the attachment member 40 is moved in parallel to the ejecting direction D1 of the fastener, so that the tip end of the contact nose 20 is inserted into the attachment member 40.

As shown in FIGS. 7A to 8B, when the contact nose 20 is inserted to an inside of the insertion portion 49 of the attachment member 40, the engaging protrusions 21*a* are introduced from the introduction openings 43*a* into the guide grooves 43. In this state, the attachment member 40 is rotated in the circumferential direction D2 of the ejecting path 13*a*.

When the attachment member 40 is rotated and the engaging protrusions 21*a* ride over the operation resisting portions 43*b* and are engaged to the engaging holding portions 43*c*, the attachment member 40 is fixed to the contact nose 20, as shown in FIGS. 9A to 10B. In this state, even when the attachment member 40 is pulled in the ejecting direction D1 of the fastener, it is not separated from the nose part 13. Also, since the attachment member 40 is locked by the operation resisting portions 43*b*, the rotation of the attachment member 40 relative to the contact nose 20 is also suppressed.

In the meantime, when it is intended to detach the attachment member 40 from the nose part 13, an operation reverse to the above sequence may be performed. That is, first, the attachment member 40 is rotated in the circumferential direction D2 of the ejecting path 13*a* (in a reverse direction to the direction upon the mounting) so that the engaging protrusions 21*a* ride over the operation resisting portions 43*b* and reach positions of the introduction openings 43*a*, as shown in FIGS. 7A to 8B. Thereby, the fixed state of the contact nose 20 and the attachment member 40 is released. Therefore, when the attachment member 40 is pulled out in the ejecting direction D1 of the fastener, the attachment member 40 can be easily detached.

In the meantime, the striking tool 10 of the present embodiment includes an attachment holding part 36 for holding the attachment member 40 detached from the nose part 13. For example, as shown in FIGS. 14A to 17B, the attachment holding part 36 is provided to the end cap part 35.

Figure 14A:
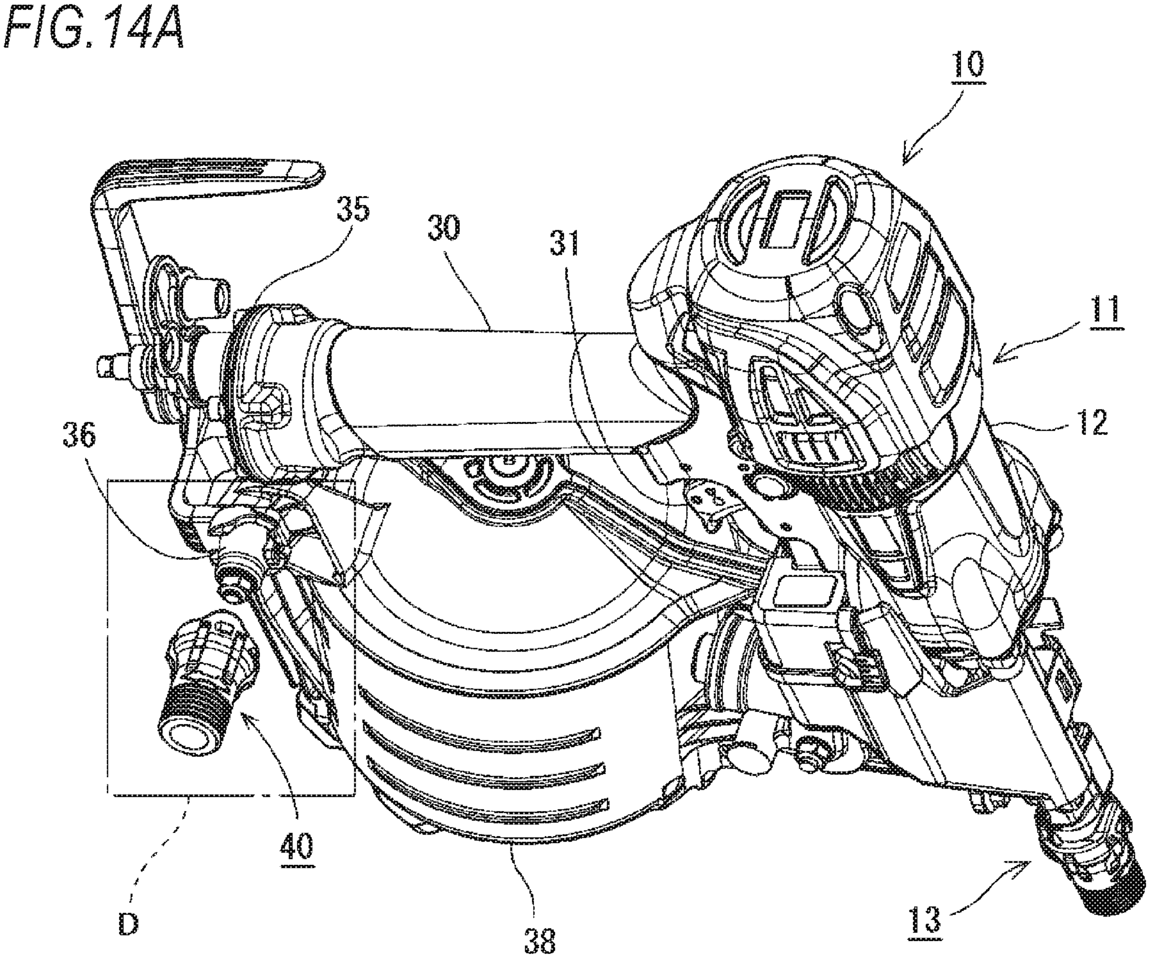
FIGS. 14A and 14B depict the striking tool before the attachment member is mounted to an attachment holding part.
Figure 14B:
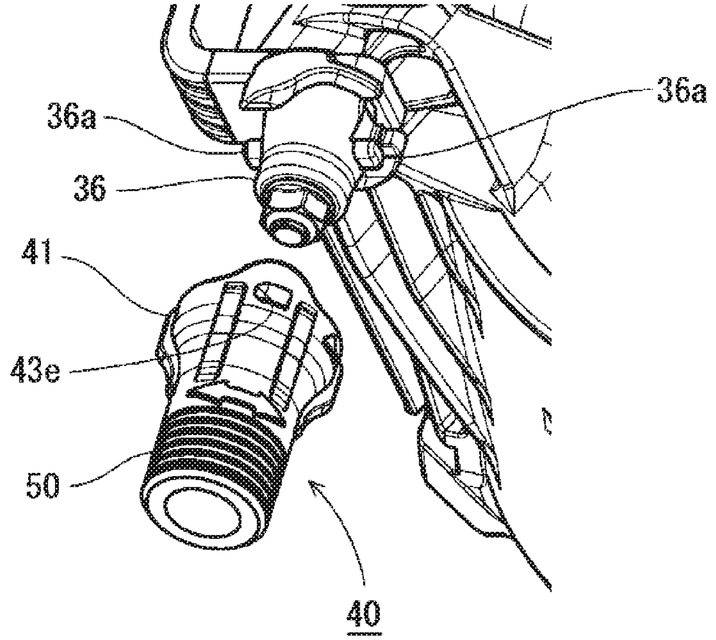

As shown in FIGS. 14A and 14B, the attachment holding part 36 of the present embodiment is a protrusion part formed to have substantially the same diameter as the ejecting part 21 of the contact nose 20, and is formed on its outer periphery with holding protrusions 36*a* each having the same shape as the engaging protrusion 21*a*.

Figure 15A:
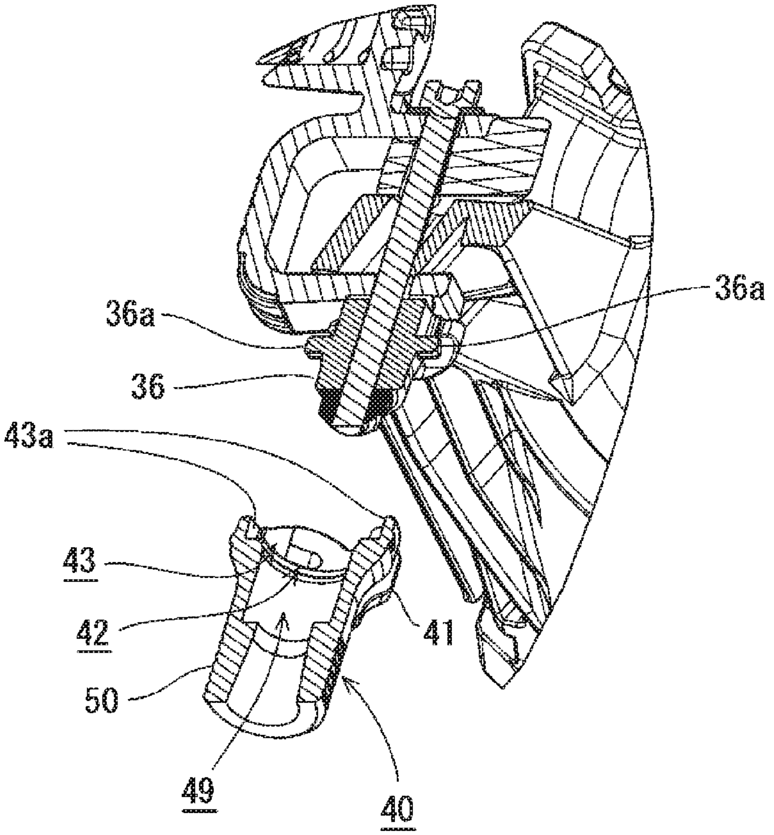
FIGS. 15A and 15B are enlarged views of the vicinity of the attachment holding part before the attachment member is mounted.
Figure 15B:
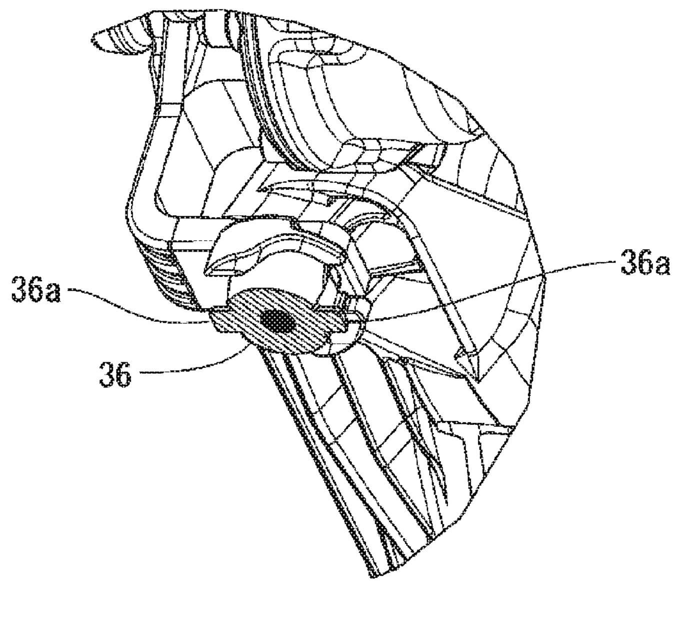
Figure 16A:
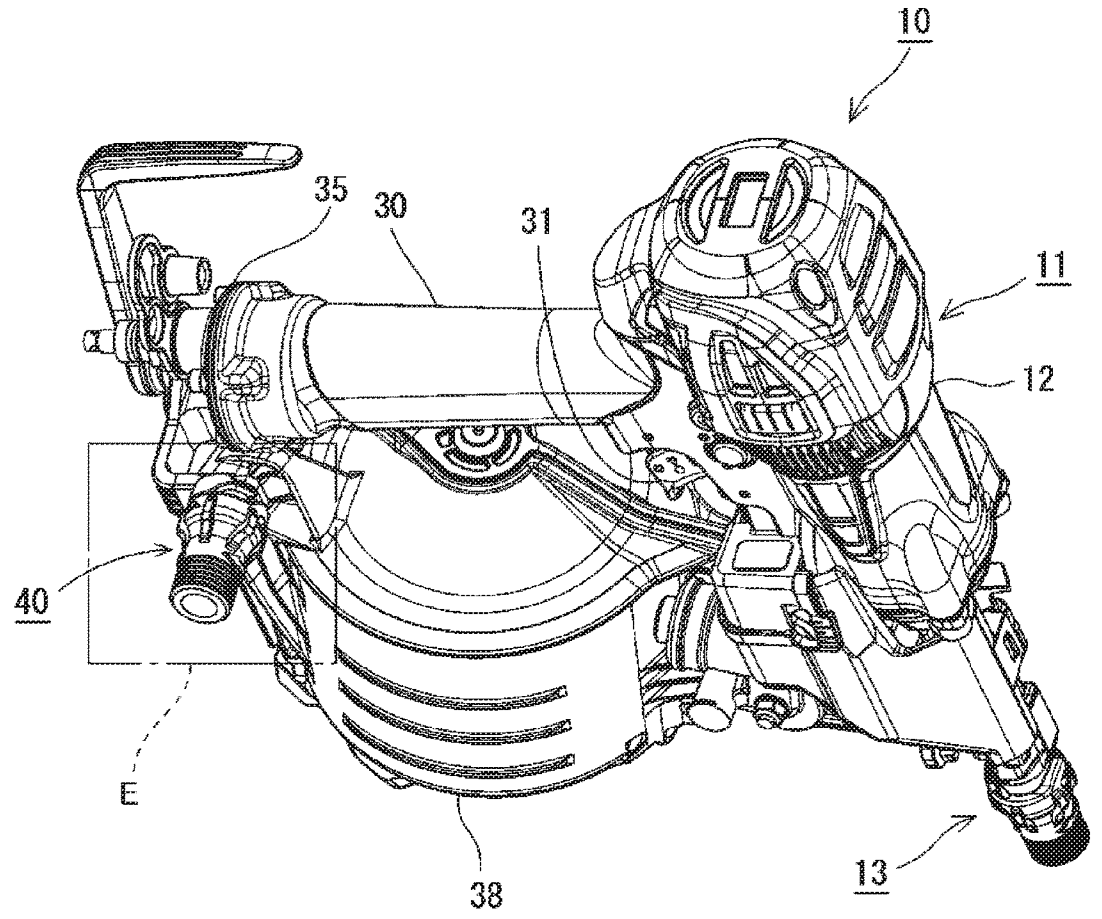
FIGS. 16A and 16B depict the striking tool after the attachment member is mounted to the attachment holding part.
Figure 16B:
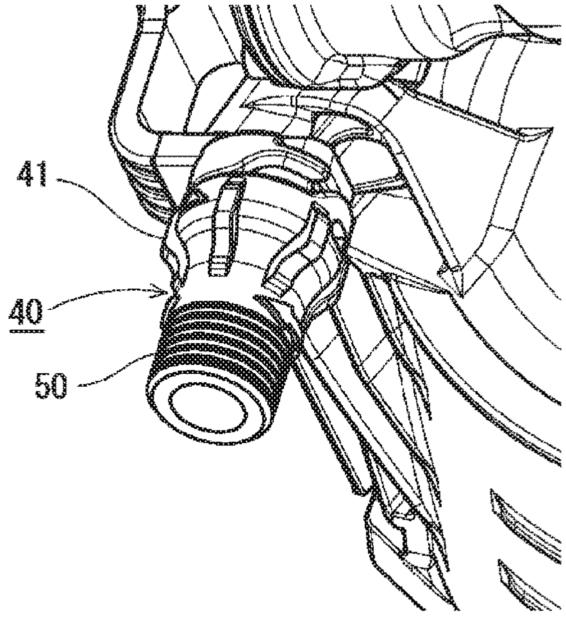
Figure 17A:
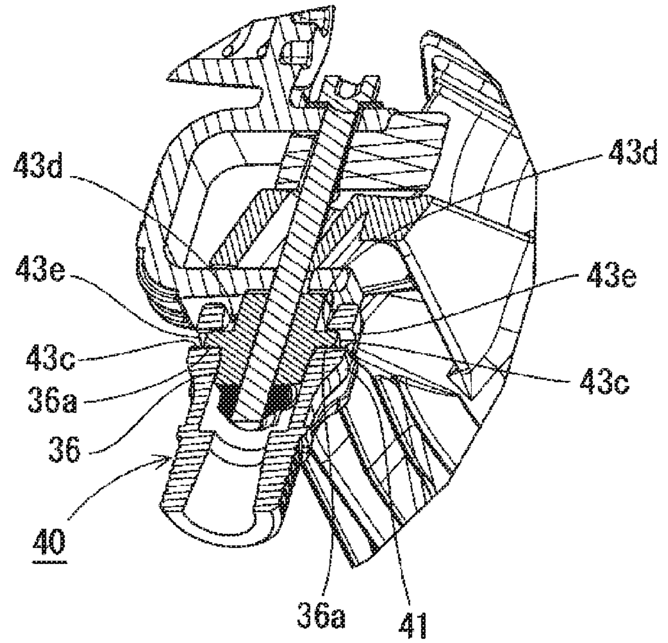
FIGS. 17A and 17B are enlarged views of the vicinity of the attachment holding part after the attachment member is mounted.
Figure 17B:
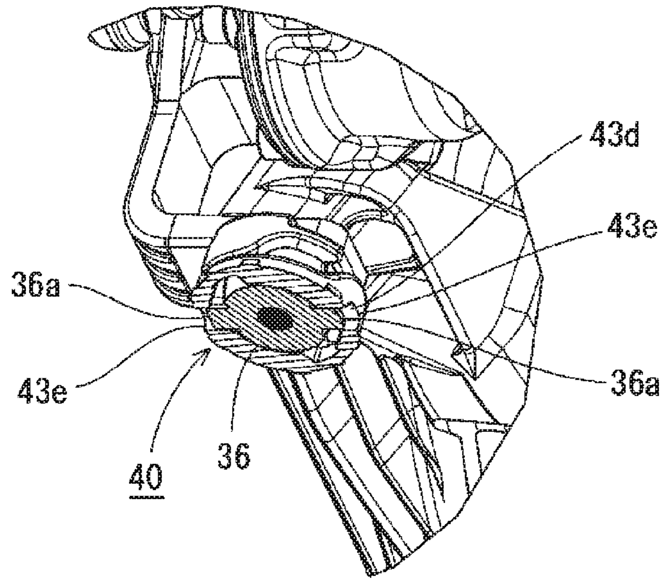

Operations of attaching and detaching the attachment member 40 to and from the attachment holding part 36 are the same as the operations of attaching and detaching the attachment member 40 to and from the nose part 13. That is, as shown in FIGS. 15A and 15B, the attachment part 41 of the attachment member 40 is directed toward a tip end of the attachment holding part 36 and the holding protrusions 36*a* are positionally aligned with the introduction openings 43*a*. Then, the tip end of the attachment holding part 36 is inserted into the attachment member 40.

Thereafter, when the attachment member 40 is rotated and the holding protrusions 36*a* ride over the operation resisting portions 43*b* and are engaged to the engaging holding portions 43*c*, the attachment member 40 is fixed to the attachment holding part 36, as shown in FIGS. 16A to 17B.

In the meantime, when it is intended to detach the attachment member 40 from the attachment holding part 36, an operation reverse to the above sequence may be performed. That is, the attachment member 40 is rotated so that the holding protrusions 36*a* ride over the operation resisting portions 43*b* and reach positions of the introduction openings 43*a*. Thereby, the fixed state of the attachment holding part 36 and the attachment member 40 is released. Therefore, when the attachment member 40 is pulled out, the attachment member 40 can be easily detached.

As described above, according to the present embodiment, the attachment member 40 is configured so that it can be fixed to and released from the attachment holding part 36 by the operation in the direction (the circumferential direction D2 of the ejecting path 13*a*) different from the ejecting direction D1 of the fastener. According to this configuration, even when the force is applied in the ejecting direction D1 of the fastener, the fixed state of the attachment member 40 is not released. Therefore, for example, even when the head of the float-struck fastener is hooked on the attachment member 40, the attachment member 40 is difficult to come off.

Also, it is possible to prevent the attachment member 40 from coming off in the ejecting direction D1 of the fastener even though the attachment member 40 is not tightly fitted. In other words, since it is not necessary to apply a large operation load for fixing or releasing the attachment member 40 to or from the nose part 13, it is possible to easily attach and detach the attachment member 40.

Also, in the present embodiment, the operation method of fixing or releasing the attachment member 40 to or from the contact nose 20 is a rotating operation, and the operation method of fixing or releasing the contact nose 20 to or from the contact arm 25 is a press-fitting or pulling-out operation. That is, the former operation direction and the latter operation direction are different. For this reason, when detaching the attachment member 40, a situation that even the contact nose 20 is unintentionally detached does not occur.

For example, in a case where the operation of detaching the attachment member 40 and the operation of detaching the contact nose 20 are the pulling-out operation, like the related art, even the contact nose 20 may be pulled out when pulling out the attachment member 40. Regarding this, when the operation of detaching the attachment member 40 and the operation of detaching the contact nose 20 are configured to be different from each other, like the present embodiment, it is possible to securely perform each of the detaching operations independently, which improves operability.

In the meantime, in the above embodiment, the nose part 13 is provided with the protrusions, and the attachment member 40 is formed with the grooves that are engaged to the protrusions. However, the present invention is not limited thereto. For example, the attachment member 40 may be provided with protrusions, and the nose part 13 may be formed with the grooves that are engaged to the protrusions.

First Modified Embodiment

In the above embodiment, the operation resisting portions 43*b* are provided, so that a sense of click is generated when rotating the attachment member 40. Instead, an aspect as shown in FIGS. 18 to 20B is also possible. In this modified embodiment, protruding members 46 formed of an elastic material are provided, instead of the operation resisting portions 43*b*.

Figure 18:
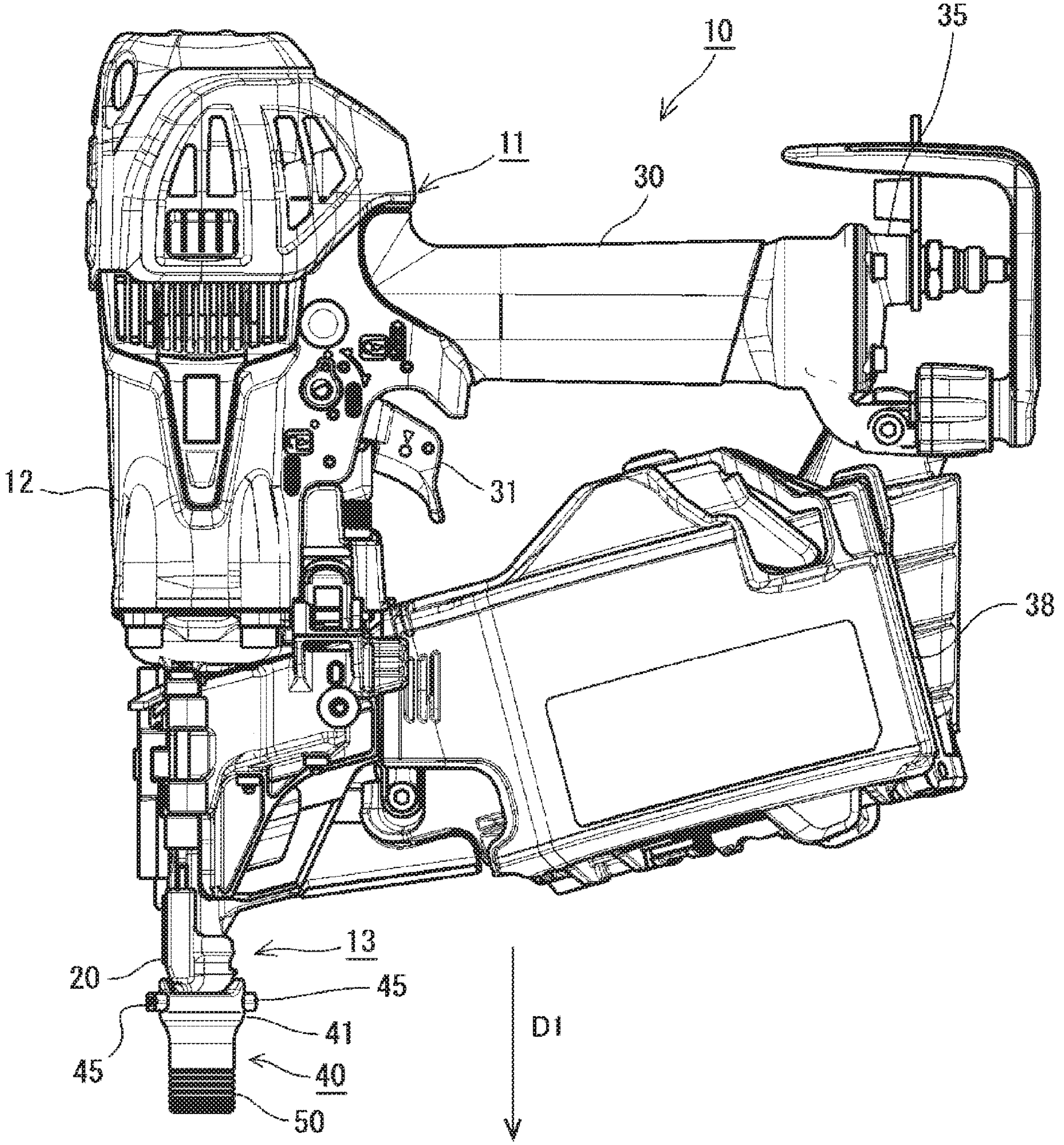
FIG. 18 depicts an outer shape of the striking tool to which an attachment member in accordance with a first modified embodiment is mounted.
Figure 19A:
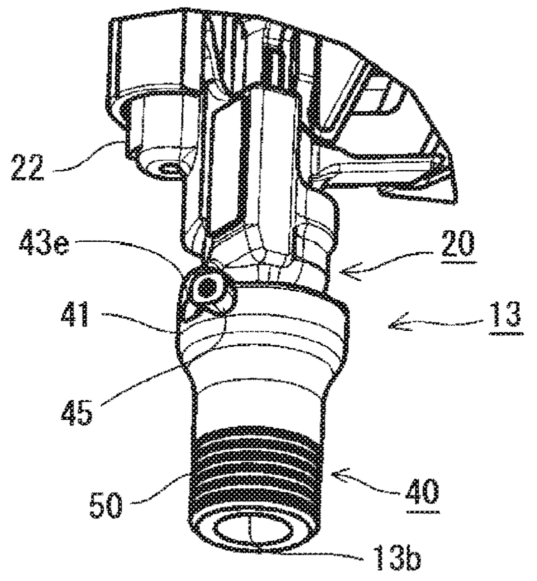
FIGS. 19A and 19B depict the nose part after the attachment member in accordance with the first modified embodiment is mounted.
Figure 19B:
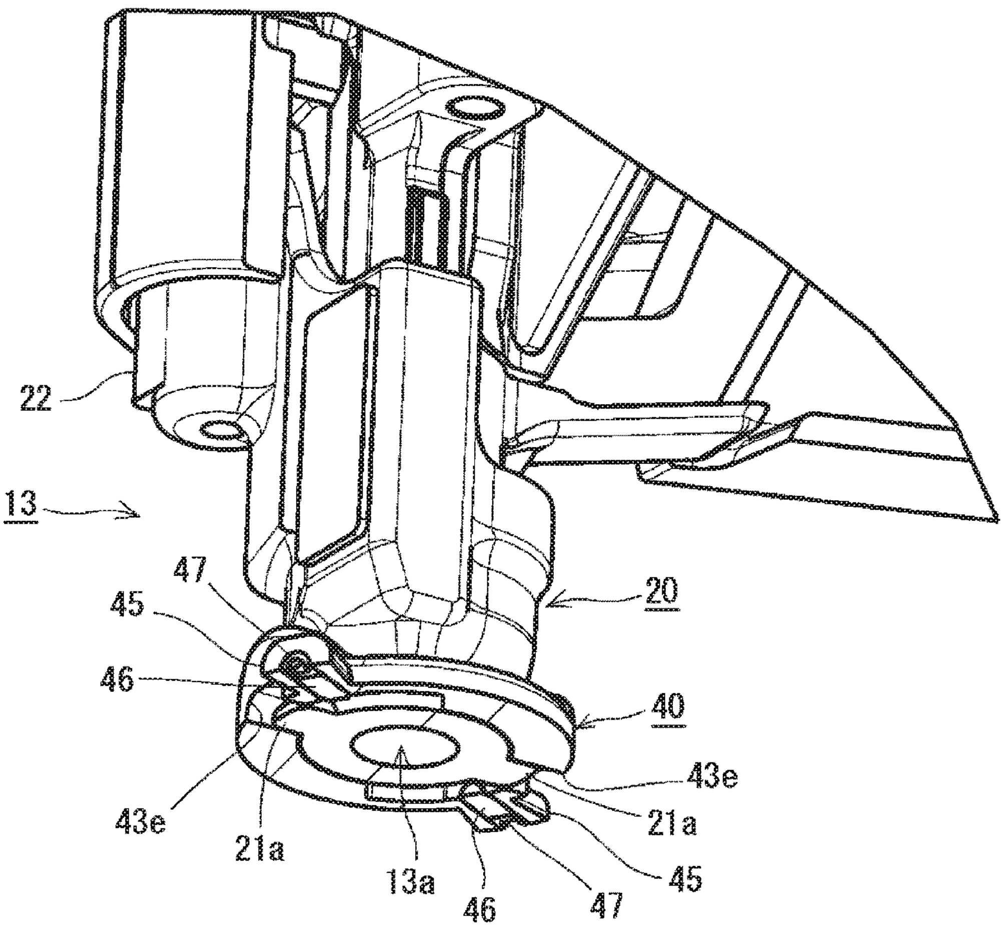

As shown in FIGS. 18 to 19B, the attachment member 40 of the present modified embodiment has two protruding tubular portions 45 protruding radially. An inside of the protruding tubular portion 45 is a hollow penetrating radially and is opened toward the guide groove 43. Also, the opening directed toward the guide groove 43 is provided with a retaining portion 45*a* formed by narrowing an opening edge. The retaining portion 45*a* is to prevent the protruding member 46 (which will be described later) from coming off toward the guide groove 43.

Figure 20A:
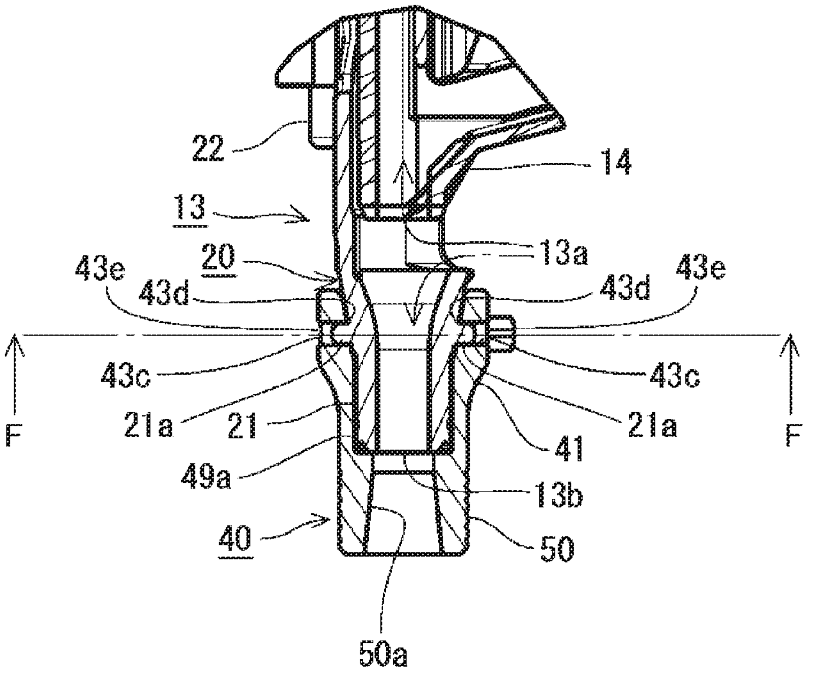
FIGS. 20A and 20B depict the nose part after the attachment member in accordance with the first modified embodiment is mounted.
Figure 20B:
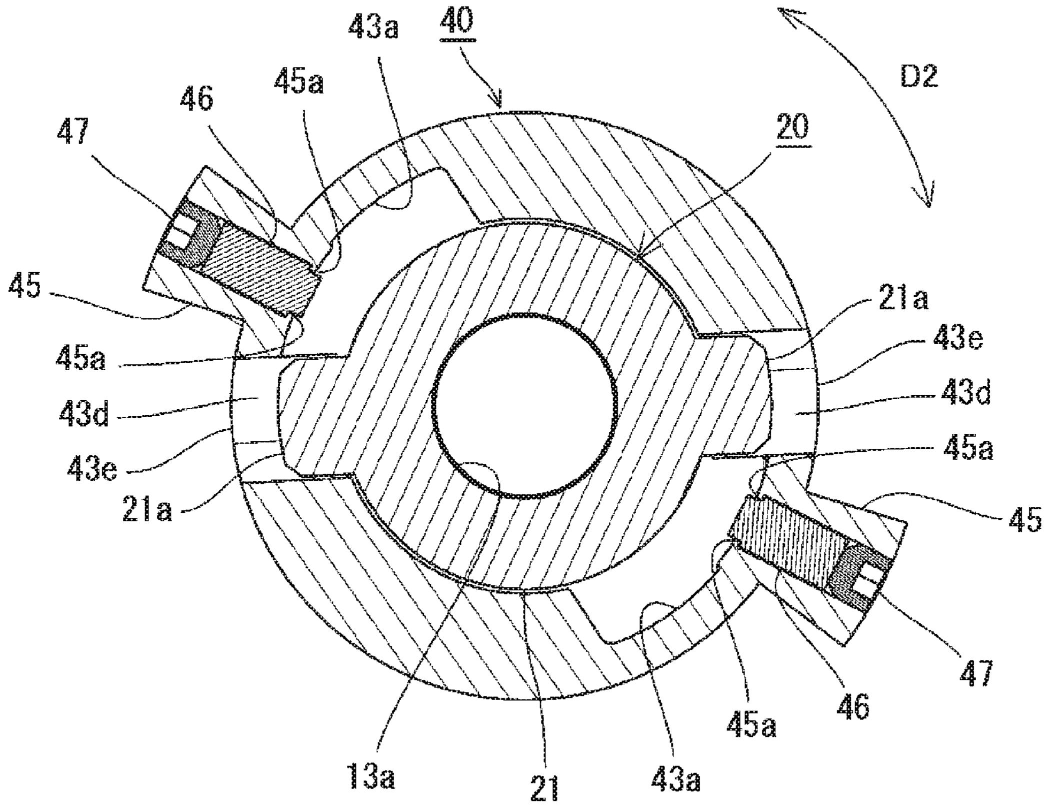

As shown in FIGS. 20A and 20B, the protruding member 46 and an anchor 47 are inserted and fixed inside the protruding tubular portion 45. The protruding member 46 is arranged on a more inner side than the anchor 47, and is arranged so that a tip end portion on an inner side thereof protrudes into the guide groove 43. Also, the anchor 47 is inserted from an outer side of the protruding member 46, and functions as a retaining member for preventing the protruding member 46 from coming off.

The tip end portion of the protruding member 46 formed of an elastic material protrudes into the guide groove 43 between the introduction opening 43*a* and the engaging holding portion 43*c*. The tip end portion of the protruding member 46 protrudes in this way, so that a sense of click is generated when fixing or releasing the attachment member 40 to or from the nose part 13.

That is, when the attachment member 40 is rotated in the circumferential direction D2 of the ejecting path 13*a* in a state where the engaging protrusions 21*a* are in the guide grooves 43, the engaging protrusions 21*a* are hooked on the tip end portions of the protruding members 46. When a rotating operation load reaches a predetermined level (a level at which the protruding member 46 is elastically deformed), the engaging protrusions 21*a* can ride over the protruding members 46.

Even with this configuration, a sense of click can be generated when rotating the attachment member 40, and the rotation of the attachment member 40 can be locked.

Second Modified Embodiment

In the above embodiment, the operation resisting portions 43*b* are provided, so that the sense of click is generated when the attachment member 40 is rotated. Instead, an aspect as shown in FIGS. 21 to 23B is also possible. In this modified embodiment, a protruding member 46 and a spring 48 are provided, instead of the operation resisting portion 43*b*.

Figure 21:
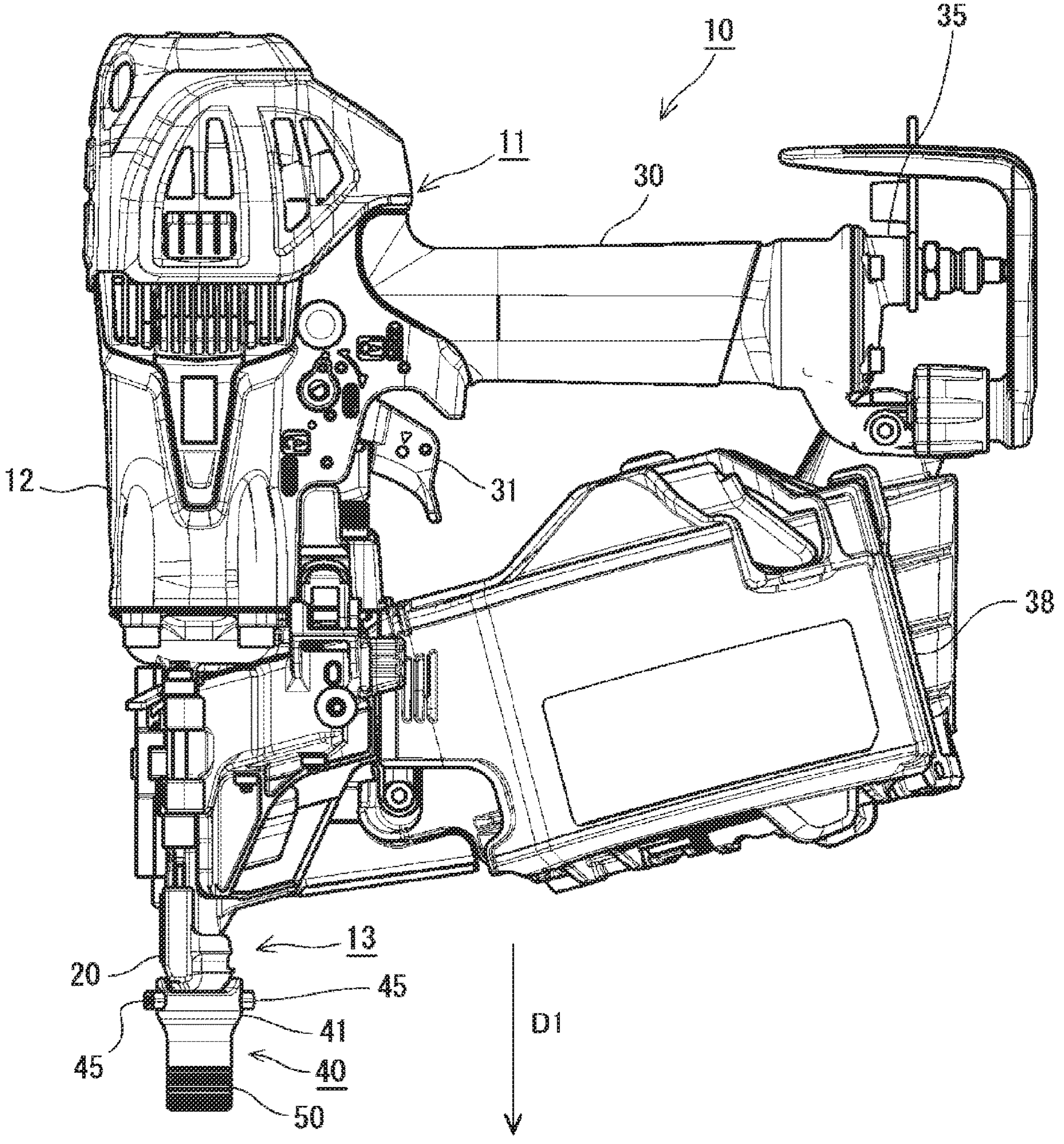
FIG. 21 depicts an outer shape of the striking tool to which an attachment member in accordance with a second modified embodiment is mounted.
Figure 22A:
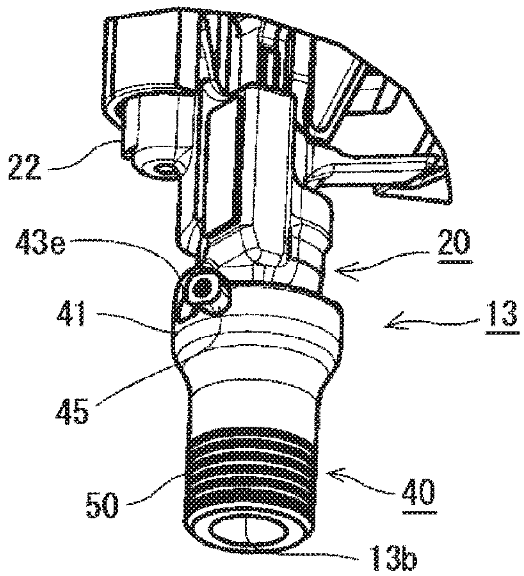
FIGS. 22A and 22B depict the nose part after the attachment member in accordance with the second modified embodiment is mounted.
Figure 22B:
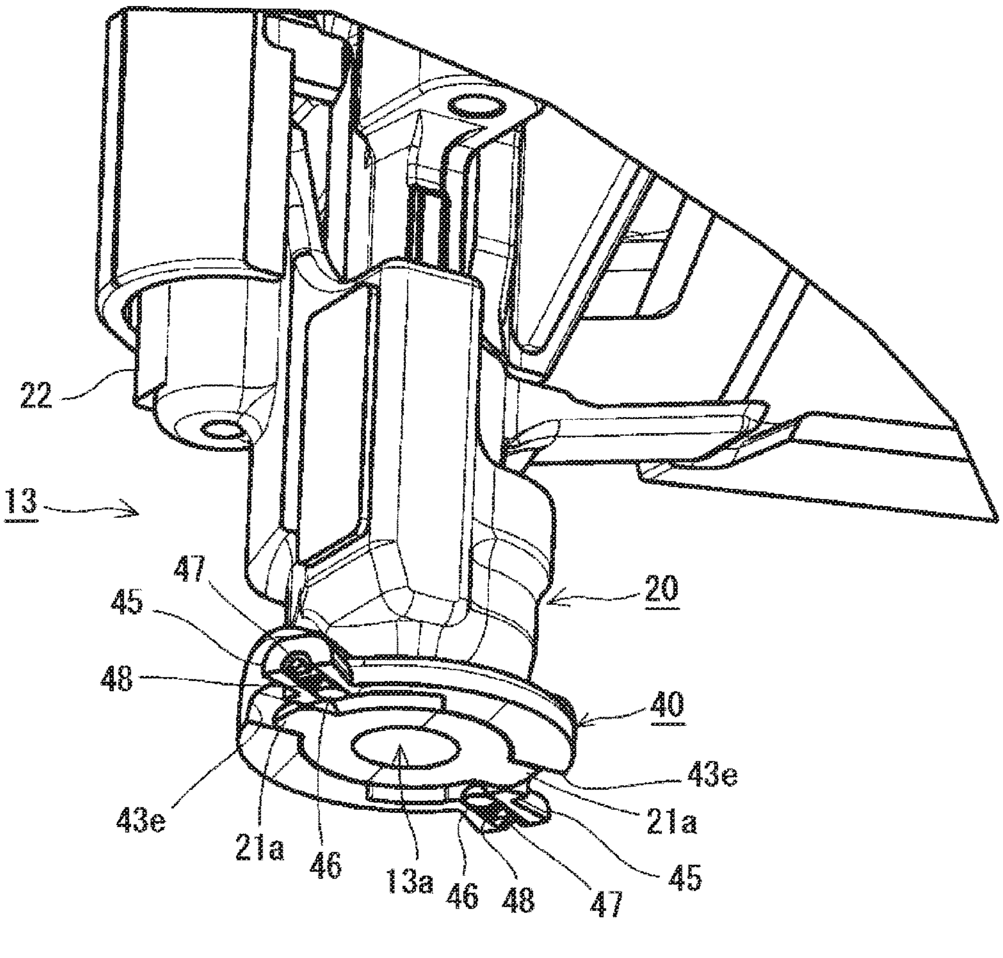

As shown in FIGS. 21 to 22B, the attachment member 40 of the present modified embodiment has two protruding tubular portions 45 protruding radially. An inside of the protruding tubular portion 45 is a hollow penetrating radially and is opened toward the guide groove 43. Also, the opening directed toward the guide groove 43 is provided with a retaining portion 45*a* formed by narrowing an opening edge. The retaining portion 45*a* is to prevent the protruding member 46 (which will be described later) from coming off toward the guide groove 43.

Figure 23A:
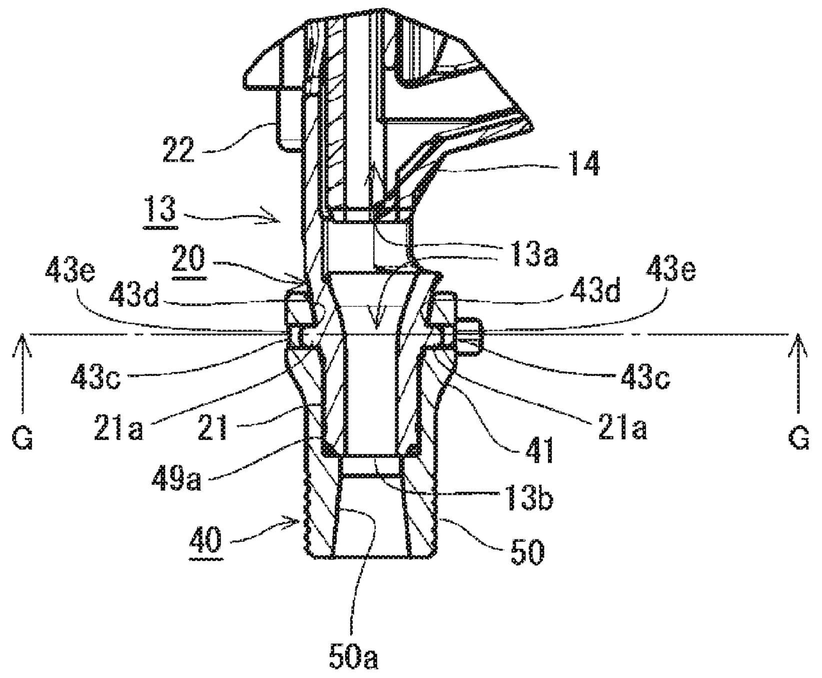
FIGS. 23A and 23B depict the nose part after the attachment member in accordance with the second modified embodiment is mounted.
Figure 23B:
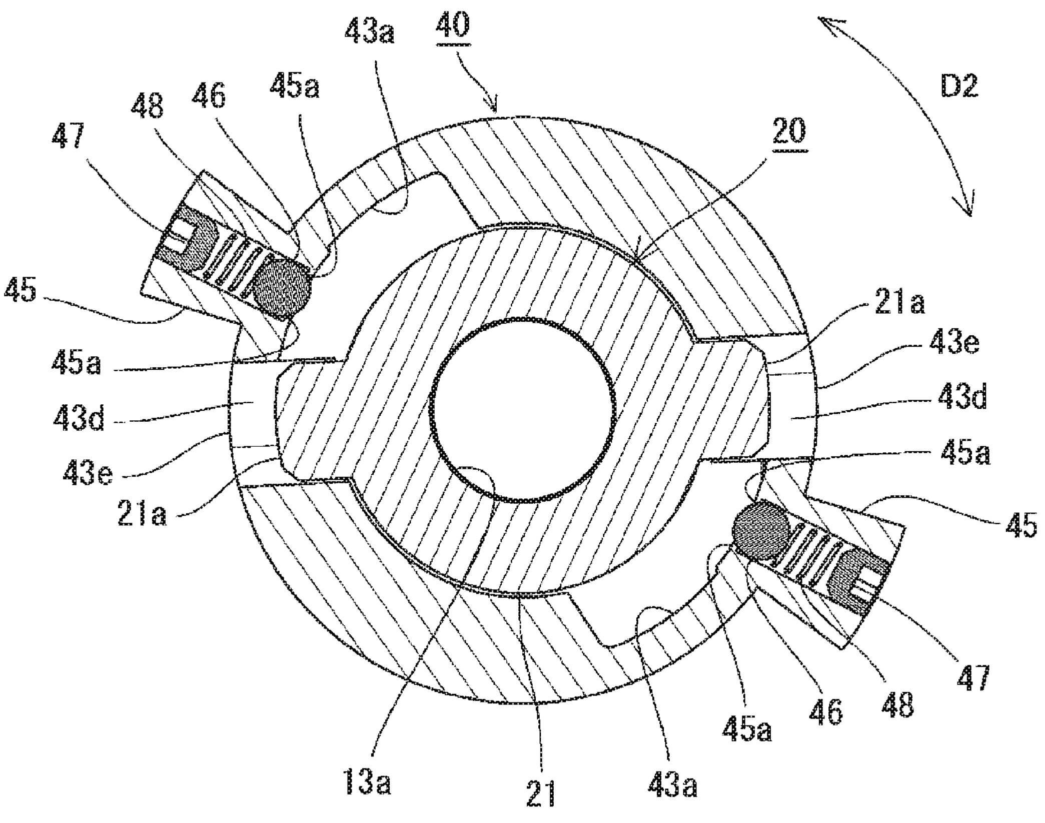

In the protruding tubular portion 45, the protruding member 46, the spring 48 and an anchor 47 are inserted in corresponding order from an inner side, as shown in FIGS. 23A and 23B. The protruding member 46 is a sphere body formed of a rigid material such as metal, and is arranged on a more inner side than the anchor 47. The spring 48 is maintained with being compressed between the protruding member 46 and the anchor 47, and urges inwardly the protruding member 46 all the time. The anchor 47 is inserted from an outer side of the spring 48, and functions as a retaining member for preventing the protruding member 46 and the spring 48 from coming off.

As described above, the protruding member 46 of the present modified embodiment is a sphere body, and a part of a spherical surface of the protruding member 46 protrudes into the guide groove 43 between the introduction opening 43*a* and the engaging holding portion 43*c*. The part of the spherical surface of the protruding member 46 protrudes in this way, so that a sense of click is generated when fixing or releasing the attachment member 40 to or from the nose part 13.

That is, when the attachment member 40 is rotated in the circumferential direction D2 of the ejecting path 13*a* in a state where the engaging protrusions 21*a* are in the guide grooves 43, the engaging protrusions 21*a* are hooked on the spherical surfaces of of the protruding members 46. When a rotating operation load reaches a predetermined level (a level at which the spring 48 is pushed in a compression direction and the protruding member 46 is thus retreated), the engaging protrusions 21*a* can ride over the protruding members 46.

Even with this configuration, a sense of click can be generated when rotating the attachment member 40, and the rotation of the attachment member 40 can be locked.

OTHER MODIFIED EMBODIMENTS

In the above embodiment, the attachment member 40 for float striking has been exemplified. However, the present invention is not limited thereto. For example, the present invention can also be applied to the attachment member 40 for protecting the member to be struck (for preventing the member to be struck from being scratched due to a claw of the tip end of the contact nose 20). Also, the present invention can be applied to the attachment member 40 that is formed to have a shape corresponding to the member to be struck and is used for positioning. Also, the present invention can be applied to the attachment member 40 having a holding function such as a washer.

Also, in the above embodiment, the attachment member 40 can be fixed or released to or from the nose part 13 by the rotating operation in the circumferential direction D2 of the ejecting path 13*a*. However, the operation for fixing or releasing the attachment member 40 is not limited to the rotating operation. For example, the attachment member 40 may be fixed or released to or from the nose part 13 by inserting the attachment member 40 in an axial direction of the ejecting path 13*a* and then sliding the attachment member 40 in a direction orthogonal to the axis of the ejecting path 13*a*. Alternatively, the attachment part 41 of the attachment member 40 and the ejection guide part 50 may be formed as separate members, and the attachment member 40 may be fixed or released to or from the nose part 13 by operating (rotating or sliding) only the attachment part 41, instead of operating the attachment member 40 itself.

In the meantime, when the attachment member 40 is formed of a resin material, the configuration including the operation resisting portion 43*b* can be integrally formed and the lightweight attachment member 40 can be manufactured at low cost. Also, when the attachment member 40 is formed using a transparent resin, the fixed state of the attachment member 40 to the nose part 13 can be visually recognized. Also, even in a state where the attachment member 40 is attached to the nose part 13, the inside of the guide path 50*a* can be visually recognized, and, for example, a state of the struck fastener can be checked.

Figure 6A:
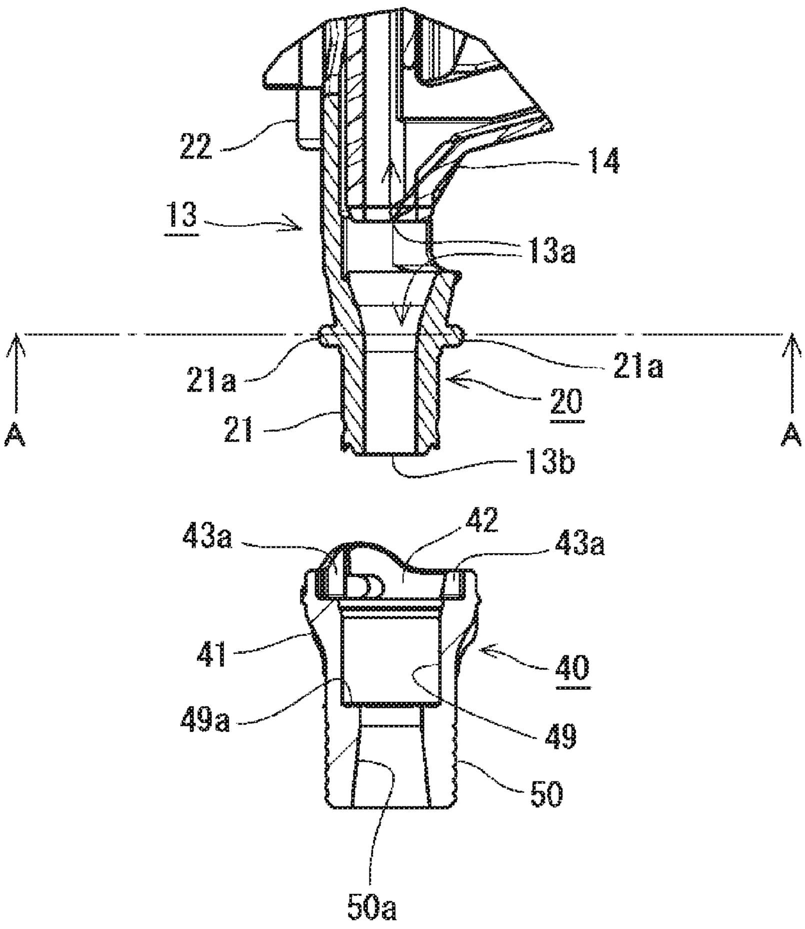
FIGS. 6A and 6B depict the nose part before the attachment member is mounted.
Figure 6B:
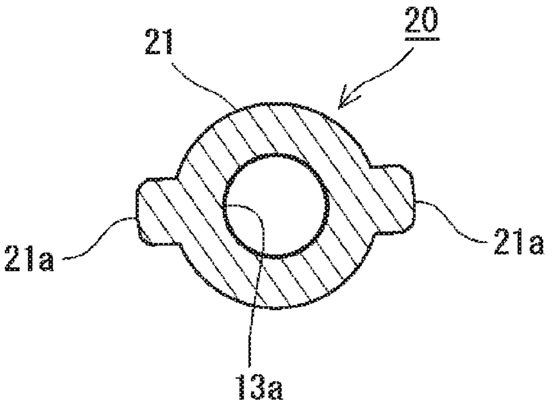
Figure 7A:
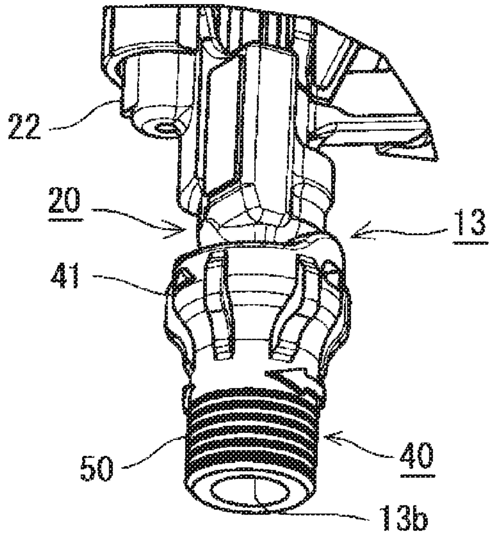
FIGS. 7A, 7B and 7C depict the nose part while the attachment member is being mounted.
Figure 7B:
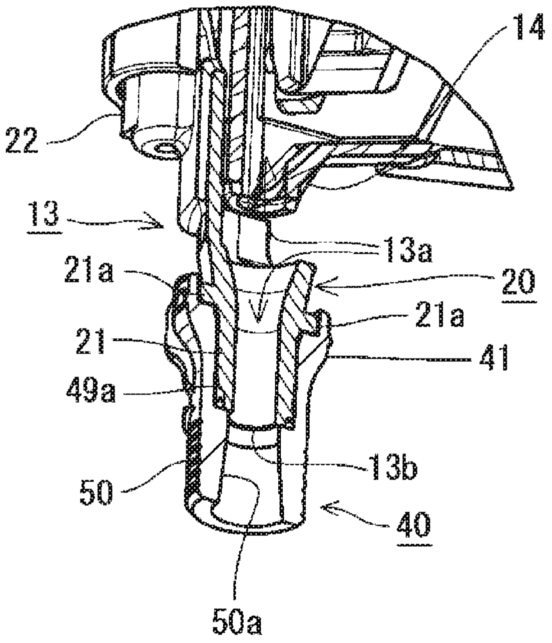
Figure 7C:
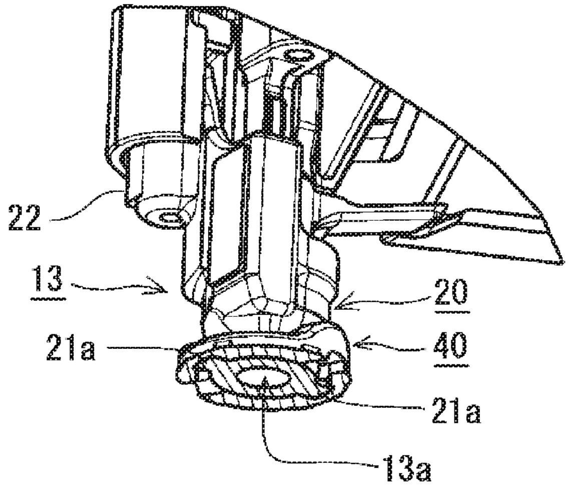
Figure 8A:
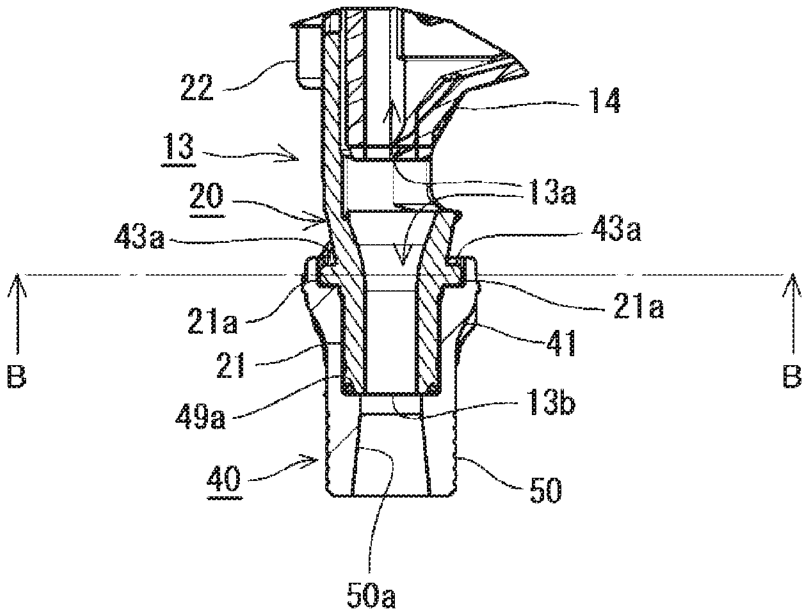
FIGS. 8A and 8B depicts the nose part while the attachment member is being mounted.
Figure 8B:
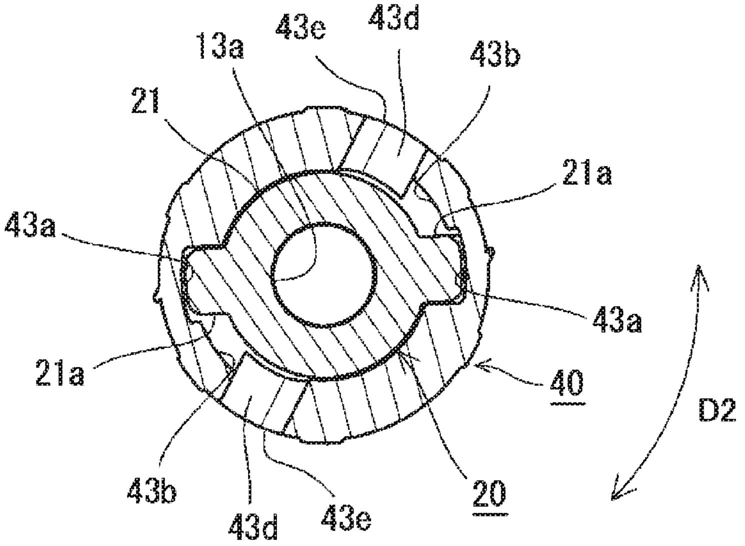
Figure 9A:
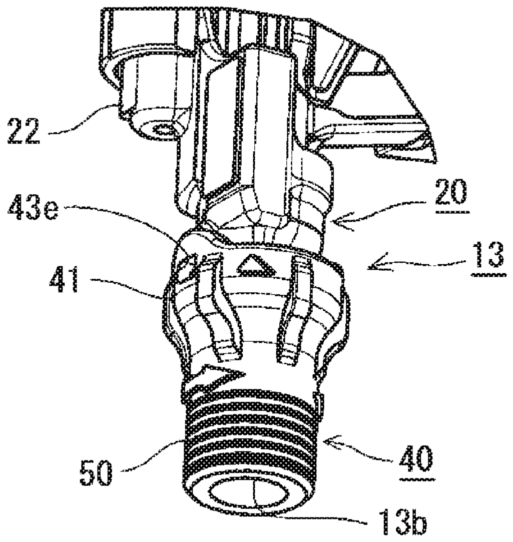
FIGS. 9A, 9B and 9C depict the nose part after the attachment member is mounted.
Figure 9B:
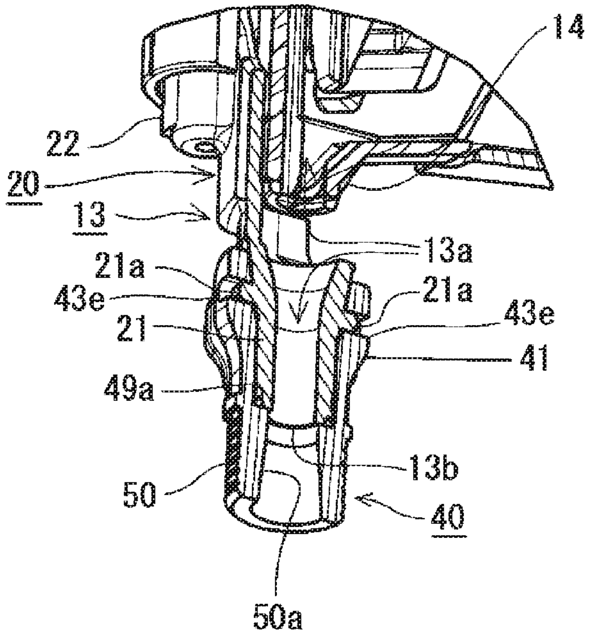
Figure 9C:
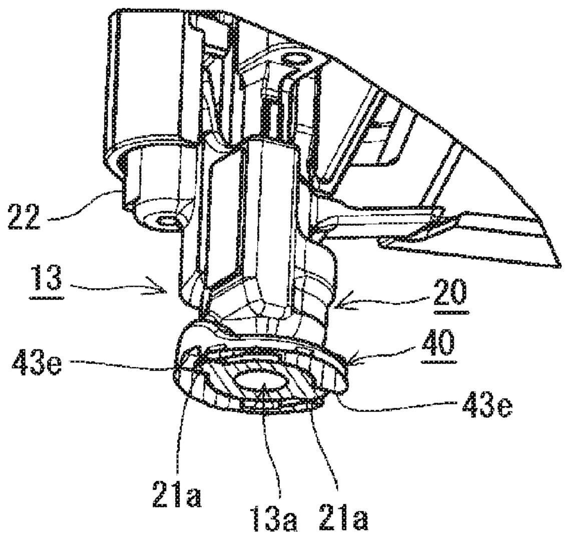
Figure 24:
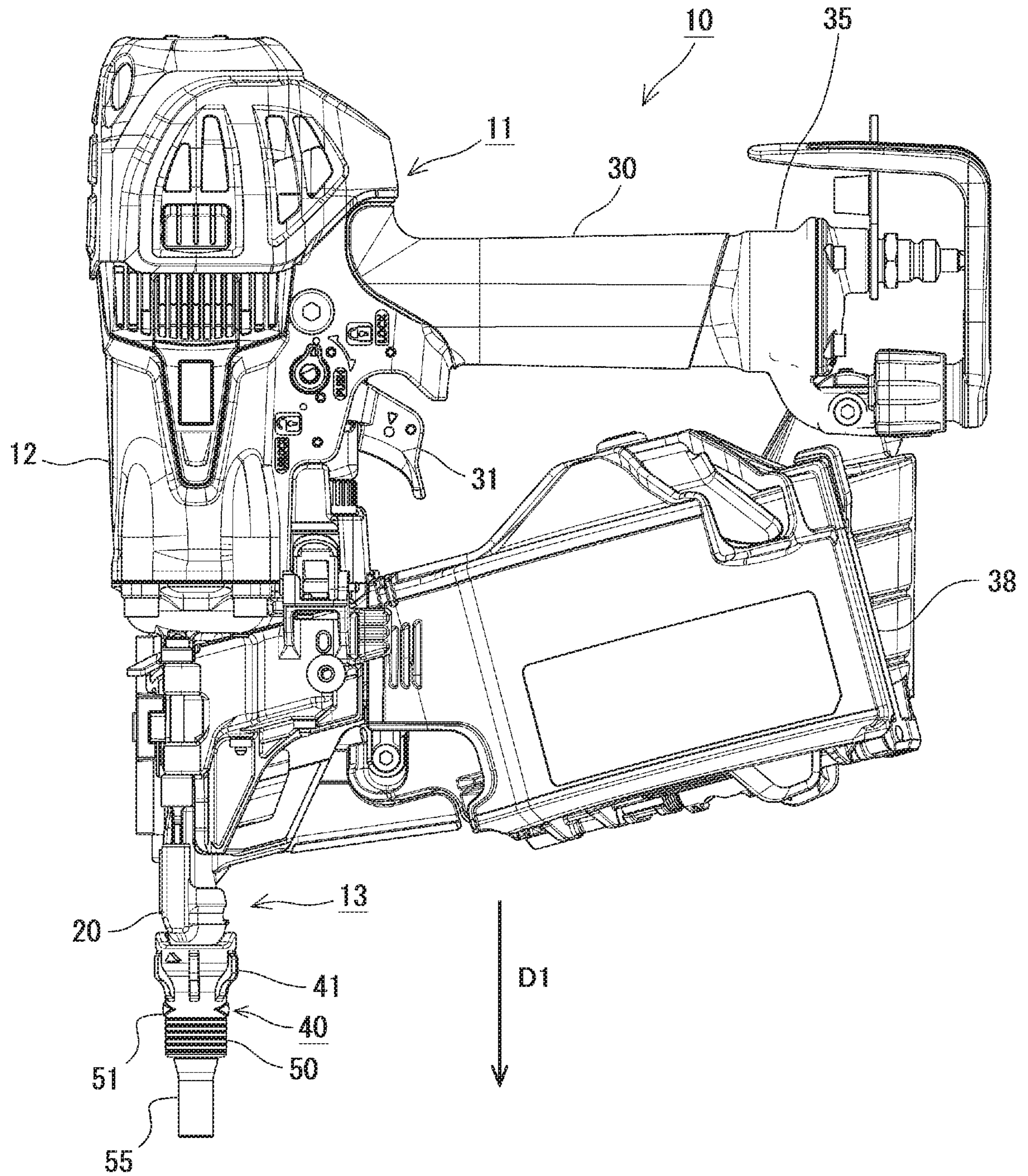
FIG. 24 depicts an outer shape of the striking tool to which an attachment member in accordance with a third modified embodiment is mounted.

Also, in the above embodiment, the attachment member 40 is basically configured by one member. However, the present invention is not limited thereto, and the attachment member 40 may be configured by two or more members. For example, as shown in FIGS. 24 to 26, the attachment member 40 may be configured by a combination of two members. In modified embodiments shown in FIGS. 24 to 26, the attachment member 40 is configured by two members of a member (a main body 51 of the attachment member 40) configuring the attachment part 41 that is detachably engaged to the contact nose 20, and a member (an extension member 55) forming a guide path 55*c* that continues to the ejecting path 13*a* of the nose part 13. In the meantime, as the main body 51 of the attachment member 40 in accordance with the present modified embodiment, a member that is similar to the attachment member 40 described with reference to FIGS. 1 to 17B can be used (however, a cylindrical bore shape equivalent to the guide path 50*a* is preferably a straight shape having a constant inner diameter, not the tapered shape as shown in FIG. 6A).

In the modified embodiments shown in FIGS. 24 to 26, an extension member 55 formed as a separate member is attached to a tip end side of the main body 51. The extension member 55 is used, so that an entire length of the attachment member 40 increases. Therefore, it is possible to increase a floating amount of the fastener upon the float striking.

The extension member 55 of the present modified embodiment is a tubular member made of metal (for example, iron) as shown in FIGS. 25A to 25E, and is fixed to the main body 51. Specifically, an inner periphery locking part 52 formed on a cylindrical inside (inner peripheral surface) of the main body 51 and an outer periphery locking part 55*a* formed on an outer peripheral surface of the extension member 55 are engaged with each other, so that the main body 51 and the extension member 55 are coupled so as not to be easily detached from each other. The coupled main body 51 and extension member 55 are fixed to each other so that they cannot move at least in the axial direction.

Figure 25A:
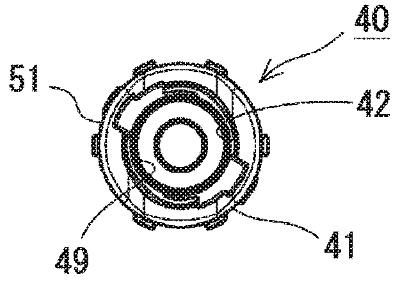
FIGS. 25A, 25B, 25C, 25D and 25E depict the attachment member in accordance with the third modified embodiment.
Figure 25B:
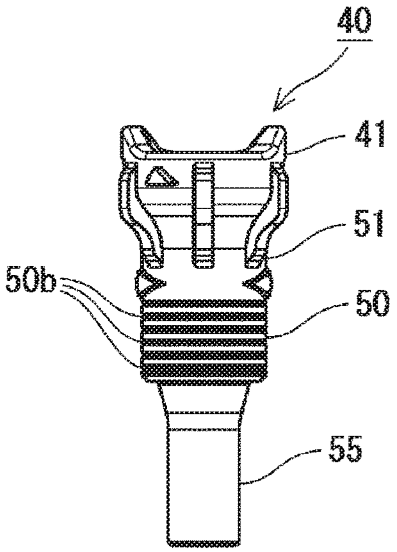
Figure 25C:
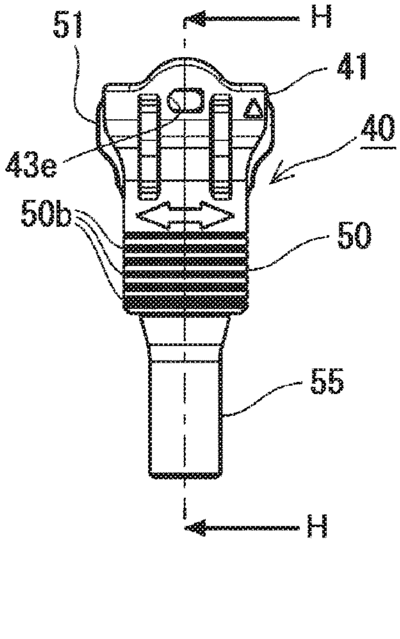
Figure 25D:
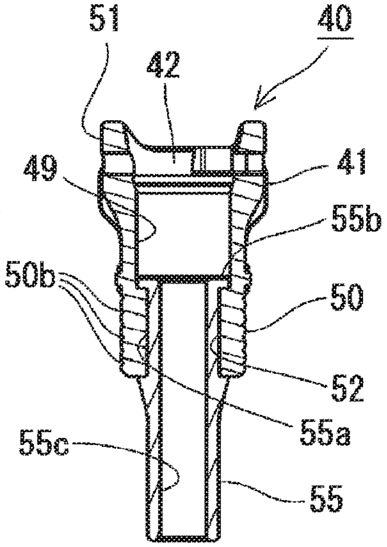
Figure 25E:
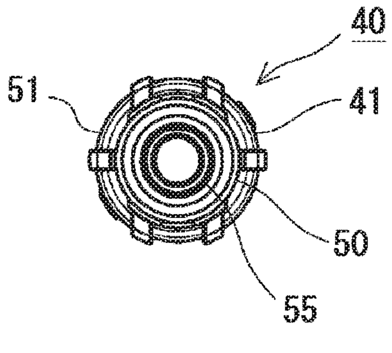
Figure 26:
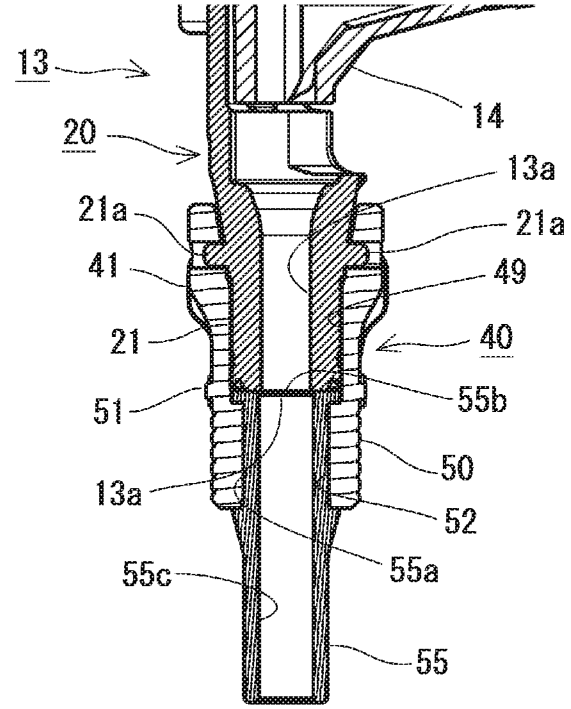
FIG. 26 is a partially enlarged sectional view in the vicinity of the nose part of the striking tool to which the attachment member in accordance with the third modified embodiment is mounted.

Also, an end face opposite to the tip end of the extension member 55 forms a butting surface 55*b* as shown in FIG. 25D. The butting surface 55*b* is provided as a flange-shaped end face of an end portion on an opposite side to the tip end of the extension member 55. As shown in FIG. 26, the butting surface 55*b* is adapted to butt against the tip end of the nose part 13 (contact nose 20) inside the main body 51 when the attachment member 40 is attached to the tip end of the nose part 13. At this time, the tip end of the nose part 13 is not necessarily required to contact the butting surface 55*b*. However, it is preferable that a clearance between the tip end of the nose part 13 and the butting surface 55*b* is smallest.

In order to prevent wear of the attachment member 40 formed of a resin material, it is preferable to avoid contact between the attachment member 40 and the fastener as much as possible. For example, it is preferable to avoid the contact with the fastener by increasing an inner diameter of the attachment member 40. However, when the inner diameter of the attachment member 40 is increased, a posture of the fastener may not be stabilized. In particular, when an entire length of the attachment member 40 becomes larger, the possibility that the posture of the fastener will be unstable increases.

In this respect, in the present modified embodiment, the extension member 55 formed of a metal material is used, and a guide path 55*c* for guiding ejection of the fastener is formed in the extension member 55. The guide path 55*c* is formed in the extension member 55 made of metal, so that even when the fastener is contacted, the guide path 55*c* is difficult to wear. For this reason, since it is not necessary to increase the inner diameter of the guide path 55*c* so as to avoid the contact with the fastener, it is possible to increase a guiding property by reducing an inner diameter of the guide path 55*c*. According to this configuration, even when the entire length of the attachment member 40 including the extension member 55 is made long, it is possible to guide the fastener while keeping stably a posture of the fastener. Also, the guide path 55*c* is formed of metal that is difficult to wear, so that it is possible to improve the durability of the attachment member 40.

As shown in FIG. 26, the inner diameter of the guide path 55*c* in accordance with the present modified embodiment is formed larger than an inner diameter of the ejecting path 13*a* (i.e., a diameter of the ejecting port 13*b*) provided in the tip end of the nose part 13. With this configuration, since the driver is difficult to collide with the attachment member 40 (extension member 55) upon the striking of the fastener, the durability of the attachment member 40 is improved.

However, the present invention is not limited thereto. For example, the inner diameter of the guide path 55*c* in the extension member 55 may be formed equal to or smaller than the inner diameter of the ejecting path 13*a* (a diameter of the ejecting port 13*b*) provided in the tip end of the nose part 13. In this way, when the inner diameter of the guide path 55*c* is formed small, it is possible to improve the guiding property for the fastener.

Also, the guide path 55*c* in the extension member 55 in accordance with the present modified embodiment has a straight shape (a shape of which an inner diameter does not change from an upstream side to a downstream side). However, the present invention is not limited thereto. For example, the guide path 55*c* may have a tapered shape with a widened tip end that progressively expands toward the tip end, a tapered shape with a narrowed tip end that progressively reduces in diameter toward the tip end, or a combined shape of the straight shape and the tapered shape (with a widened tip end or with a narrowed tip end). In the meantime, in a case where the tapered shape with a widened tip end is adopted, since the fastener is difficult to collide with the attachment member 40 (extension member 55), it is possible to improve the durability of the attachment member 40. Also, in a case where the tapered shape with a narrowed tip end is adopted, it is possible to improve the guiding property for the fastener.

In the above embodiment and modified embodiments, the example where the attachment member 40 (main body 51) is formed of an elastic member such as a resin material has been described. However, the present invention is not limited thereto. For example, the attachment member 40 may also be formed of a metal material such as iron and aluminum.

According to an aspect of the invention, there is provided a striking tool having an ejecting path of a fastener which is formed in a nose part, and configured to sequentially strike fasteners supplied to the nose part, the striking tool comprising: an attachment member that can be attached to and detached from a tip end of the nose part, wherein the attachment member can be fixed to and released from the nose part by an operation in a direction different from an ejecting direction of the fastener.

According to the present invention as described above, the attachment member can be fixed to and released from the nose part by an operation in a direction different from the ejecting direction of the fastener. According to this configuration, even when a force is applied in the ejecting direction of the fastener, a fixed state of the attachment member is not released. Therefore, for example, when a head of a nail float-struck is hooked on the attachment member, the attachment member is difficult to come off.

Also, even though the attachment member is not tightly fitted when fixing the same, the attachment member can be prevented from coming off in the ejecting direction of the fastener. In other words, since it is not necessary to apply a large operation load for fixing or releasing the attachment member to or from the nose part, it is possible to easily attach and detach the attachment member.

What is claimed is:

1. A striking tool comprising:

a nose part having an ejecting path, the nose part to which fasteners are supplied and from which the fasteners are sequentially ejected;

an attachment member that is attached to and detached from a tip end of the nose part, wherein one of the nose part and the attachment member includes an engaging protrusion, and the other of the nose part and the attachment member includes a guide groove, the guide groove including a receiving portion groove and a holding portion groove, the holding portion groove extending in a direction different from an ejecting direction of the fasteners, wherein the attachment member is attached to and detached from the nose part by an operation of the attachment member in the direction different from the ejecting direction of the fasteners, wherein the attachment member is attached to the nose part in which (i) the receiving portion groove of the guide groove receives the engaging protrusion, and (ii) the engaging protrusion is guided from the receiving portion groove of the guide groove to the holding portion groove of the guide groove and the engaging protrusion is moved along the holding portion groove in the direction different from the ejecting direction of the fasteners by the operation of the attachment member in the direction different from the ejecting direction of the fasteners; and a protrusion portion which overhangs at least part of the guide groove, the protrusion portion configured such that when the engaging protrusion is engaged with the holding portion groove, movement of the engaging protrusion along the ejecting direction of the fasteners is regulated by the protrusion portion overhanging the at least part of the guide groove, wherein the guide groove includes an operation resisting portion configured to resist movement of the engaging protrusion in the direction different from the ejecting direction of the fasteners, and wherein the guide groove has a first portion in which a radial distance between the first portion and the engaging protrusion is a first distance and a second portion in which a radial distance between the second portion and the engaging protrusion is a second distance shorter than the first distance (i) during an attachment of the attachment member to the nose part by the operation of the attachment member in the direction different from the ejecting direction of the fasteners to guide the engaging protrusion from the receiving portion groove of the guide groove to the holding portion groove of the guide groove, and (ii) during a detachment of the attachment member from the nose part by the operation of the attachment member in the direction different from the ejecting direction of the fasteners to guide the engaging protrusion from the holding portion groove of the guide groove to the receiving portion groove of the guide groove, and the second portion is the operation resisting portion.

2. The striking tool according to claim 1, wherein the operation of the attachment member in the direction different from the ejecting direction of the fasteners is a rotating operation in a circumferential direction of the ejecting path.

3. The striking tool according to claim 1, wherein the nose part has a contact member that can be pressed against a member to be struck during striking, and the attachment member is attached to a tip end of the contact member.

4. The striking tool according to claim 3, wherein the attachment member has an insertion portion into which a cylindrical tip end of the contact member is inserted.

5. The striking tool according to claim 1, wherein the operation resisting portion becomes a resistance against the engaging protrusion (i) during the attachment of the attachment member to the nose part by the operation of the attachment member in the direction different from the ejecting direction of the fasteners to guide the engaging protrusion from the receiving portion groove of the guide groove to the holding portion groove of the guide groove, and (ii) during the detachment of the attachment member from the nose part by the operation of the attachment member in the direction different from the ejecting direction of the fasteners to guide the engaging protrusion from the holding portion groove of the guide groove to the receiving portion groove of the guide groove.

6. The striking tool according to claim 1, wherein (i) during the attachment of the attachment member to the nose part in which the engaging protrusion is guided from the receiving portion groove of the guide groove to the holding portion groove of the guide groove, and (ii) during the detachment of the attachment member from the nose part in which the engaging protrusion is guided from the holding portion groove of the guide groove to the receiving portion groove of the guide groove, the engaging protrusion rides over the operation resisting portion to generate a sense of a click.

7. The striking tool according to claim 6, wherein the attachment member includes the guide groove, and the operation resisting portion is integrally formed as a part of the attachment member formed of an elastic member.

8. The striking tool according to claim 1, wherein a side part of the attachment member is formed with an opened check window through which attachment of the attachment member to the nose part is visually recognized.

9. The striking tool according to claim 1, wherein the attachment member has a guide path continuing to the ejecting path, and an inner diameter of the guide path is formed to progressively increase toward a direction of a tip end.

10. The striking tool according to claim 1, further comprising:

a trigger that is provided operably so as to strike the fasteners; and the nose part including:

a contact arm that is slid to enable an operation of the trigger in a state in which the nose part is pressed against a member to be struck, and a contact nose that can be attached to and detached from the contact arm, wherein the attachment member can be attached to and detached from a tip end of the contact nose, and an operation of attaching or detaching the attachment member to or from the contact nose and an operation of attaching or detaching the contact nose to or from the contact arm are different from each other.

11. The striking tool according to claim 10, wherein the contact nose is press-fitted in parallel to the ejecting direction of the fasteners, so that the contact nose can be attached to and detached from the contact arm.

12. The striking tool according to claim 1, further comprising an attachment holding part which holds the attachment member in a state in which the attachment member is detached from the nose part, wherein the attachment member can be attached to and detached from the attachment holding part by the same operations of attaching and detaching the attachment member to and from the nose part.

13. The striking tool according to claim 1, wherein an extension member formed as a separate member from the attachment member is attached to a tip end side of the attachment member.

14. The striking tool according to claim 1, wherein:

the guide groove has an L-shape and is formed on an inner periphery of the other of the nose part and the attachment member that includes the guide groove, the receiving portion groove extends in an axial direction on the inner periphery of the other of the nose part and the attachment member, and the receiving portion groove forms a portion of the L-shape of the guide groove, and the holding portion groove extends in a circumferential direction on the inner periphery of the other of the nose part and the attachment member, and the holding portion groove forms another portion of the L-shape of the guide groove different from the portion formed by the receiving portion groove.

15. The striking tool according to claim 14, wherein the other of the nose part and the attachment member that includes the guide groove includes a plurality of guide grooves which each have an L-shape and which each include a receiving portion groove and a holding portion groove, and the one of the nose part and the attachment member that includes the engaging protrusion includes a corresponding engaging protrusion for each guide groove in the plurality of guide grooves.

16. The striking tool according to claim 15, wherein each guide groove of the plurality of guide grooves is arranged at equal intervals in a circumferential direction of the other of the nose part and the attachment member that includes the guide groove.

17. The striking tool according to claim 1, wherein in a state in which the engaging protrusion is engaged with the holding portion groove of the guide groove, the operation of the attachment member in the direction different from the ejecting direction of the fasteners is stopped such that attachment of the attachment member to the nose part is completed, and in said state the engaging protrusion is spaced from the receiving portion groove in a circumferential direction along an inner periphery of the other of the nose part and the attachment member.

18. The striking tool according to claim 1, wherein the attachment member includes the guide groove and the nose part includes the engaging protrusion.

19. The striking tool according to claim 1, wherein the attachment member includes the engaging protrusion and the nose part includes the guide groove.

20. The striking tool of claim 1, wherein:

the receiving portion groove extends in an axial direction on an inner periphery of the other of the nose part and the attachment member, and the holding portion groove extends in a circumferential direction on the inner periphery of the other of the nose part and the attachment member.

21. The striking tool of claim 1, wherein the guide groove includes a bottom surface having the first portion and the second portion.

22. The striking tool of claim 1, wherein the engaging protrusion is formed of an elastic material.

* * * * *